US009805392B2

(12) United States Patent
Connelly et al.

(10) Patent No.: US 9,805,392 B2
(45) Date of Patent: Oct. 31, 2017

(54) SIMULATING ONLINE USER ACTIVITY TO GENERATE AN ADVERTISING CAMPAIGN TARGET AUDIENCE LIST

(71) Applicant: ORACLE INTERNATIONAL CORPORATION, Redwood Shores, CA (US)

(72) Inventors: John Patrick Connelly, Santa Cruz, CA (US); Edward Lawrence Wallace, Medina, WA (US); Mayank Dedhia, Milpitas, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 358 days.

(21) Appl. No.: 14/593,331

(22) Filed: Jan. 9, 2015

(65) Prior Publication Data

US 2016/0005073 A1 Jan. 7, 2016

Related U.S. Application Data

(60) Provisional application No. 62/020,206, filed on Jul. 2, 2014.

(51) Int. Cl.
*G06Q 30/00* (2012.01)
*G06Q 30/02* (2012.01)

(52) U.S. Cl.
CPC ..... *G06Q 30/0255* (2013.01); *G06Q 30/0242* (2013.01); *G06Q 30/0244* (2013.01); *G06Q 30/0276* (2013.01); *G06Q 30/0277* (2013.01)

(58) Field of Classification Search
USPC .... 705/14.4, 14.41, 14.43, 14.49, 14.73, 10; 709/224, 226
See application file for complete search history.

(56) References Cited

U.S. PATENT DOCUMENTS

| 7,219,299 | B2 * | 5/2007 | Fields | G06Q 10/107 715/205 |
| 7,418,454 | B2 * | 8/2008 | Chen | H04L 67/2804 |

(Continued)

OTHER PUBLICATIONS

"BlueKai Platform Enables Brands to Break the Silos Between Offline and Online Interactions, Enabling Consistent Activation Across Disparate Channels" BlueKai, Jul. 2, 2013, 2 pages, url: http://finance.yahoo.com/news/bluekai-platform-enables-brands-break-130000410.html.

*Primary Examiner* — Luis A Brown
(74) *Attorney, Agent, or Firm* — Kilpatrick Townsend & Stockton LLP

(57) ABSTRACT

The present disclosure provides a detailed description of techniques used in methods, systems, and computer program products for simulating user web page visits to generate an advertising campaign target audience list. The claimed embodiments address the problem of efficiently and quickly processing voluminous amounts of user data to enable rapid initiation of an advertising campaign. More specifically, the claimed embodiments are directed to approaches for a receiving user web page visit records (e.g., user ID, URL, timestamp, etc.), preparing batches of the visit records, and iterating through the batches of visits to simulate a user's re-visit to the web page. The simulated user visits and associated user attributes (e.g., from on line and off line activities) can then be tested against advertising campaign specifications to generate a target audience list.

24 Claims, 17 Drawing Sheets

(56) References Cited

U.S. PATENT DOCUMENTS

| | | | | |
|---|---|---|---|---|
| 7,620,690 B1* | 11/2009 | Castelli | G06Q 10/107 | 709/206 |
| 7,634,570 B2* | 12/2009 | Paya | G06F 17/30902 | 709/227 |
| 7,757,288 B1* | 7/2010 | Khalsa | H04L 63/145 | 713/188 |
| 8,200,661 B1* | 6/2012 | Pearce | G06F 17/30867 | 707/721 |
| 8,874,658 B1* | 10/2014 | Khalsa | H04L 51/12 | 709/206 |
| 2002/0004733 A1* | 1/2002 | Addante | G06Q 30/02 | 705/14.51 |
| 2006/0047684 A1* | 3/2006 | Cherkauer | G06F 17/30368 | |
| 2007/0038516 A1* | 2/2007 | Apple | G06Q 30/0243 | 705/14.42 |
| 2007/0239722 A1* | 10/2007 | Phillips | G06F 17/30867 | |
| 2008/0189169 A1* | 8/2008 | Turpin | G06Q 30/02 | 705/7.33 |
| 2008/0189408 A1* | 8/2008 | Cancel | G06Q 30/02 | 709/224 |
| 2008/0235243 A1* | 9/2008 | Lee | G06F 17/30867 | |
| 2008/0249832 A1* | 10/2008 | Richardson | G06Q 30/02 | 705/14.46 |
| 2009/0030780 A1* | 1/2009 | York | G06Q 30/02 | 705/14.41 |
| 2009/0271414 A1* | 10/2009 | Benson | H04L 67/02 | |
| 2011/0106616 A1* | 5/2011 | Bigby | G06Q 30/02 | 705/14.49 |
| 2011/0119136 A1* | 5/2011 | Eldreth | G06Q 30/02 | 705/14.69 |
| 2011/0196721 A1* | 8/2011 | Addante | G06Q 30/02 | 705/14.4 |
| 2011/0246267 A1* | 10/2011 | Williams | G06Q 30/02 | 705/14.4 |
| 2012/0047013 A1 | 2/2012 | Bigby et al. | | |
| 2012/0054627 A1* | 3/2012 | Priyadarshan | G06Q 30/02 | 715/738 |
| 2012/0166273 A1* | 6/2012 | Zadikario | G06Q 30/0246 | 705/14.45 |
| 2014/0081742 A1* | 3/2014 | Katsur | G06Q 30/02 | 705/14.46 |
| 2015/0356632 A1* | 12/2015 | Vempati | G06Q 30/02 | 705/14.71 |
| 2016/0125471 A1* | 5/2016 | Hsu | G06Q 30/0269 | 705/14.66 |

* cited by examiner

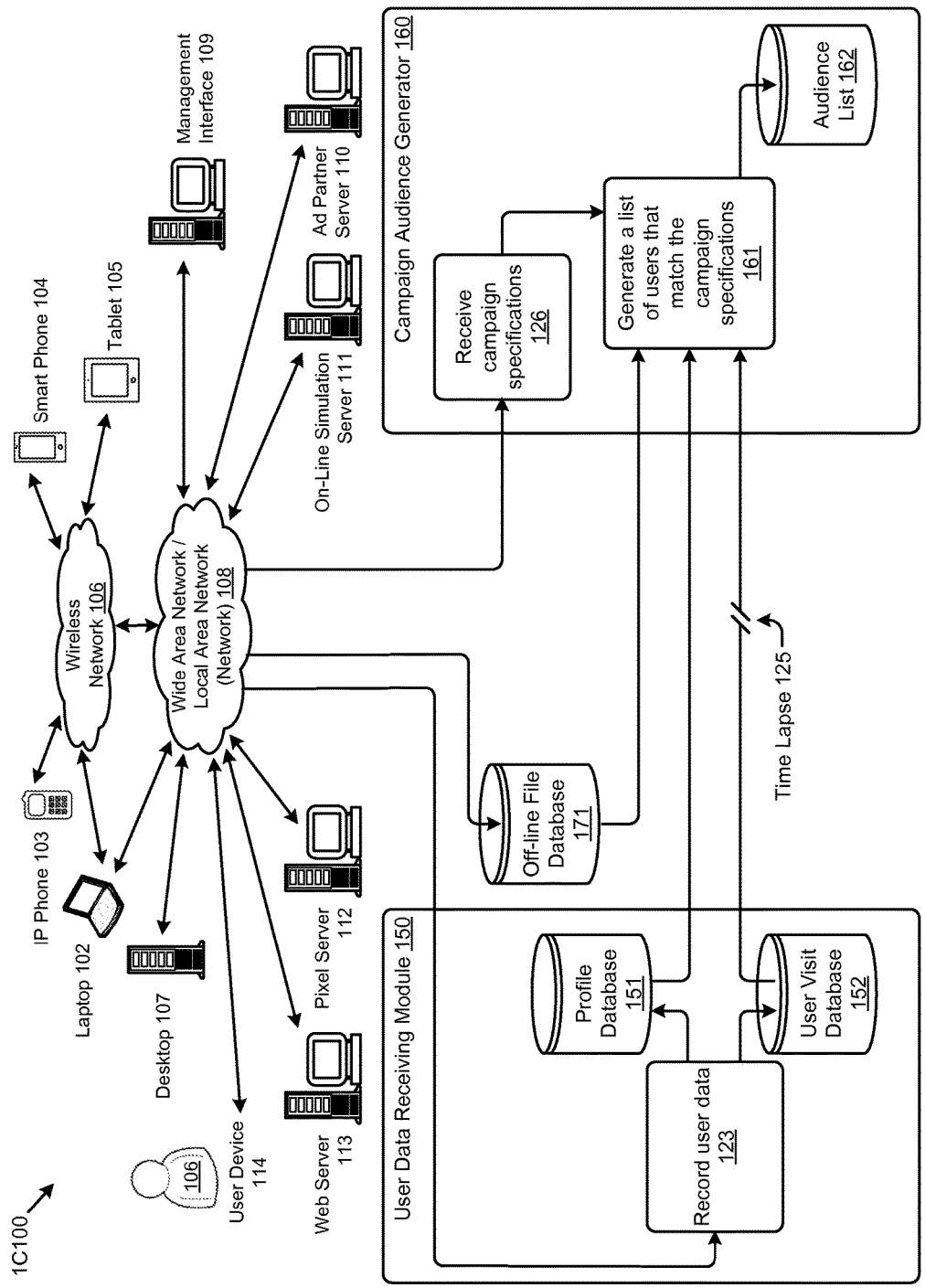
FIG. 1C1

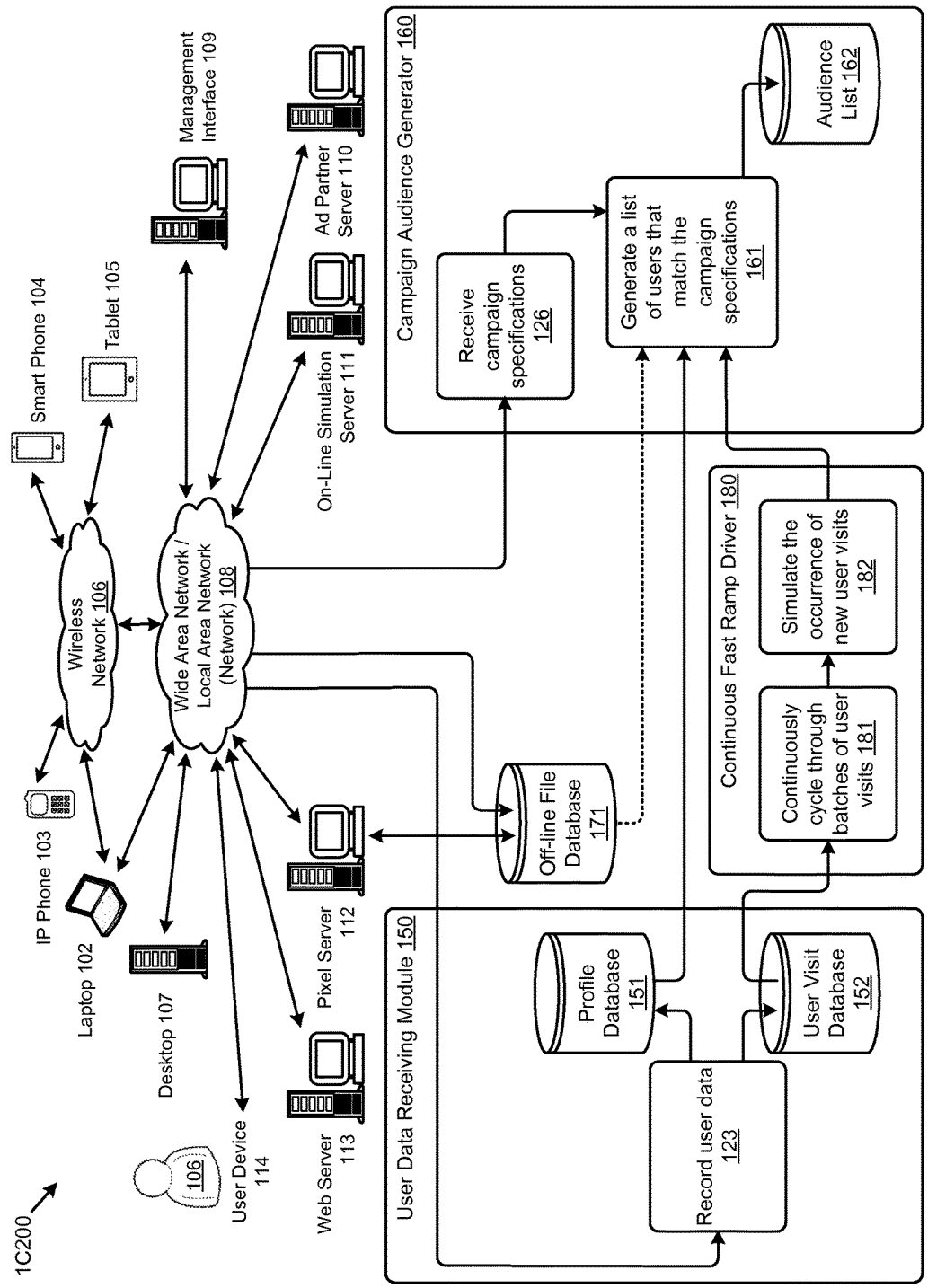
FIG. 1C2

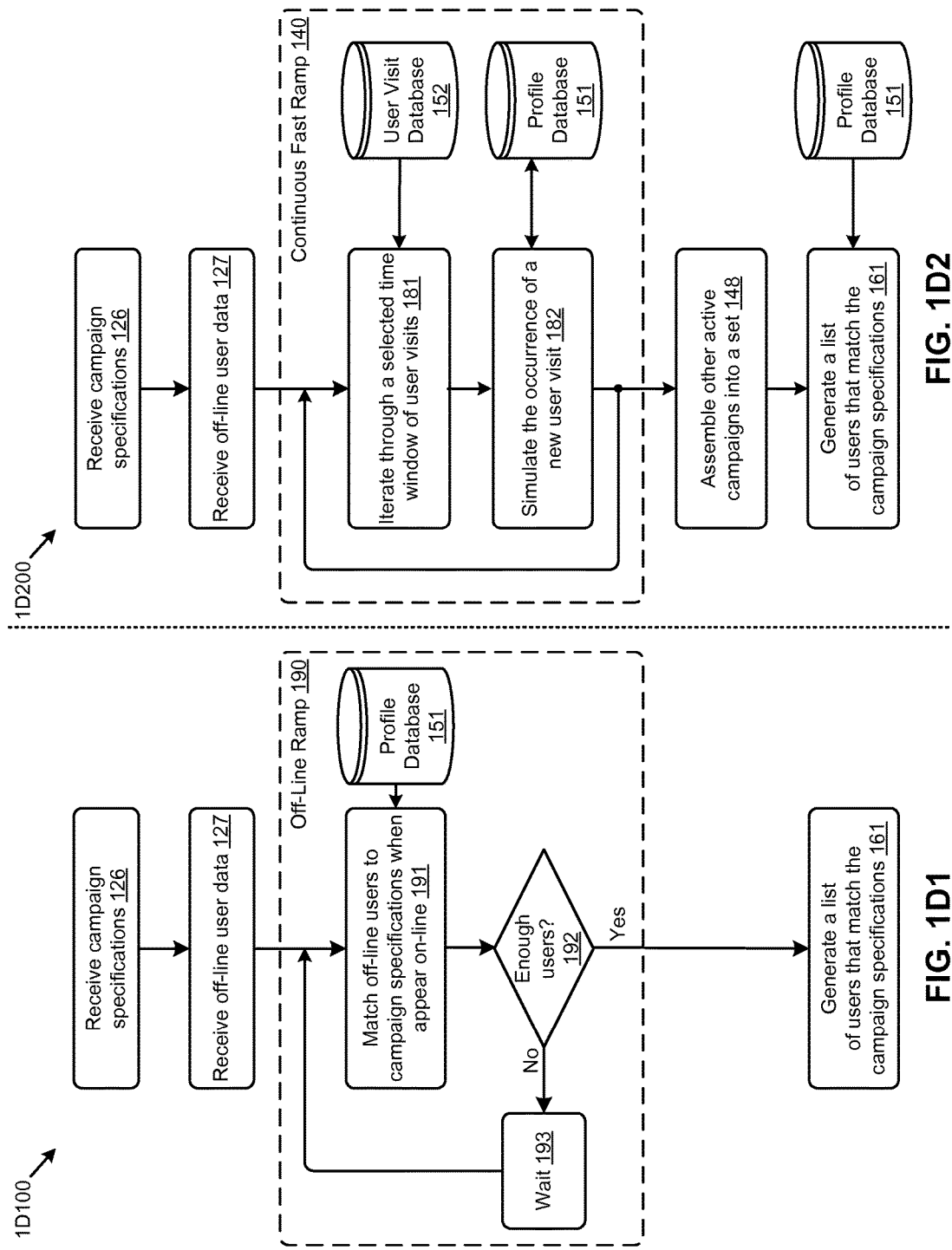
FIG. 1D2
FIG. 1D1

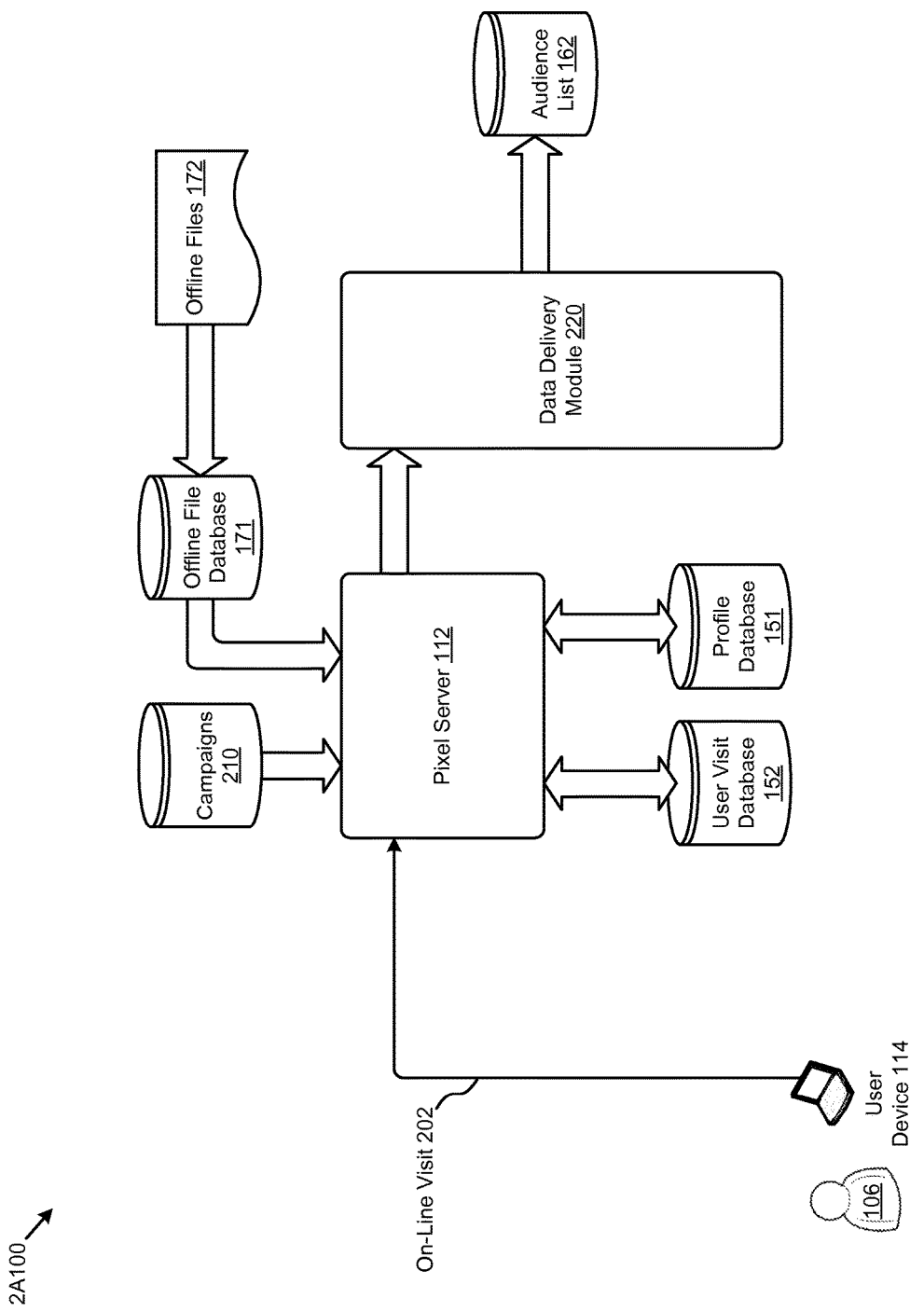
FIG. 2A1

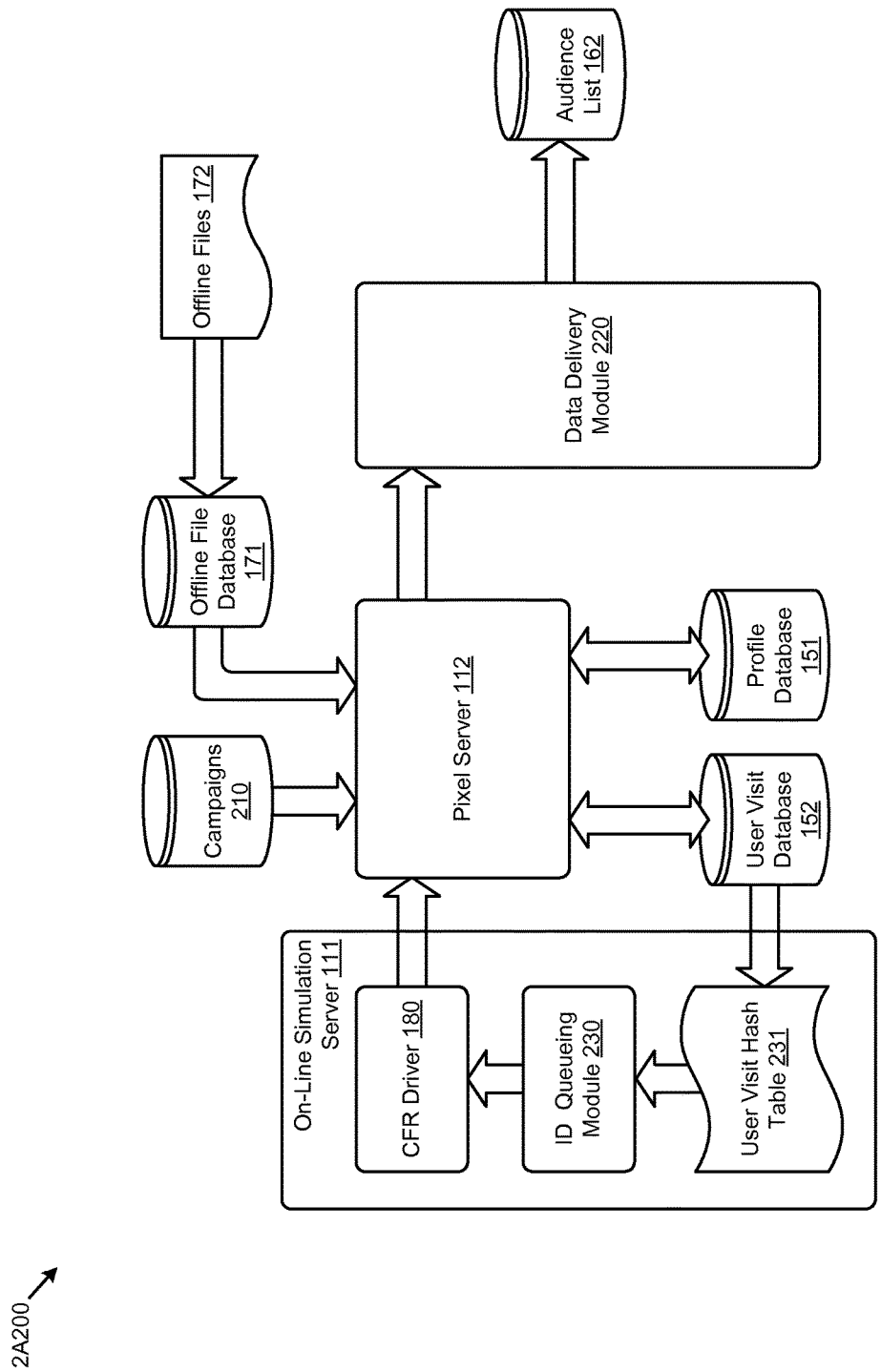
FIG. 2A2

SIMULATING ONLINE USER ACTIVITY TO GENERATE AN ADVERTISING CAMPAIGN TARGET AUDIENCE LIST

RELATED APPLICATIONS

The present application claims the benefit of priority to U.S. Provisional Patent Application Ser. No. 62/020,206, entitled "GENERATING A MARKETING CAMPAIGN TARGET LIST" filed Jul. 2, 2014; which is hereby incorporated by reference in it's entirety.

FIELD

The disclosure relates to the field of online data aggregation and more particularly to techniques for simulating user web page visits to generate an advertising campaign target audience list.

BACKGROUND

Advertisers want to prosecute advertising campaigns for specific purposes. Sometimes the purpose of such campaigns demands reaching target audiences sharing particular attributes (e.g., "women with a college degree in the 24-28 age range living in California", etc.) in order to optimize the effectiveness of the campaign. In some cases, lists of audience members sharing such attributes can be compiled by querying online data recorded for those members (e.g., online users). For example, a woman of age 25 living in Manhattan Beach, Calif. might visit an online website, and in the course of her online visit, she might accept a cookie or otherwise leave a record of her online visit. Such a cookie or other record of her online visit might be stored and accessed at a later moment in time. In many cases, her online visit might also immediately trigger some action related to a campaign (e.g., check for a match of the user to the campaign target audience). In some cases, an advertising campaign might include user data that is only available from offline activity (e.g., a user makes a purchase at the advertiser's store or kiosk). Audience list constituents (e.g., targeted candidates) for an advertising campaign may be described at least in part by offline data. For example, offline data might be collected at a brick-and-mortar retail store (e.g., in-store purchase records, point-of-sale rewards program registration, etc.). Such offline user data can be combined with online user data associated with the same user, and the combination can be used in a query to generate an audience list.

In some legacy situations, offline user data can be combined with online user data whenever the user browses the advertiser's site. When an advertiser seeks to prosecute a campaign, the advertiser often wants to ramp up the campaign quickly, reaching a maximum highly-targeted audience volume in a short period of time. However, is it quite possible that not all of the potential candidates for the campaign will login or otherwise appear in online setting at or near the time of the campaign launch so as to trigger combining offline data with online data so as to update the user's profile and/or the user's demographics. What is needed is a technique or techniques for efficiently and quickly processing voluminous amounts of user data to simulate online user visits so as to trigger combining offline data with online data so as to update the user's offline data, and so as to quickly ramp-up an advertising campaign with current demographics.

None of the aforementioned legacy approaches achieve the capabilities of the herein-disclosed techniques for iterating through a set of user web page visits and simulating new user web page visits to generate an advertising campaign target audience list. Therefore, there is a need for improvements.

SUMMARY

The present disclosure provides an improved method, system, and computer program product suited to address the aforementioned issues with legacy approaches. More specifically, the present disclosure provides a detailed description of techniques used in methods, systems, and computer program products for simulating user web page visits to generate an advertising campaign target audience list.

The claimed embodiments address the problem of efficiently and quickly processing voluminous amounts of user data to enable a fast ramp-up of an advertising campaign. More specifically, some embodiments are directed to approaches for rapid and continuous refreshing of aggregated online data for immediate deployment in an advertising campaign, which embodiments advance the technical fields for addressing the problem of efficiently and quickly processing voluminous amounts of user data to enable a fast ramp-up of an advertising campaign, as well as advancing peripheral technical fields. Some embodiments and techniques thereto improve the functioning of multiple systems within the disclosed environments.

More specifically, the claimed embodiments are directed to approaches for processing user web page visit records (e.g., user ID, URL, timestamp, etc.), preparing batches of the visit records, and iterating through each batch of visits to simulate a new user visit to the web page. The simulated user visits and associated user attributes (e.g., from online and offline activities) can then be tested against advertising campaign specifications to generate a target audience list.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

FIG. 1C1 depicts a flow for generating an advertising campaign target audience list.

FIG. 1C2 depicts a flow for simulating user web page visits to generate an advertising campaign target audience list.

FIG. 1D1 presents a logic flow used for capturing web page profiles instead of simulating user web page visits to generate an advertising campaign target audience list.

FIG. 1D2 presents a logic flow used for simulating user web page visits to generate an advertising campaign target audience list, according to some embodiments.

FIG. 2A1 is a block diagram of a system for generating a database of historical user visits to generate an advertising campaign target audience list, according to some embodiments.

FIG. 2A2 is a block diagram of a system for iterating through a time window of historical user visits to simulate user web page visits to generate an advertising campaign target audience list, according to some embodiments.

DETAILED DESCRIPTION

Figure 1A:
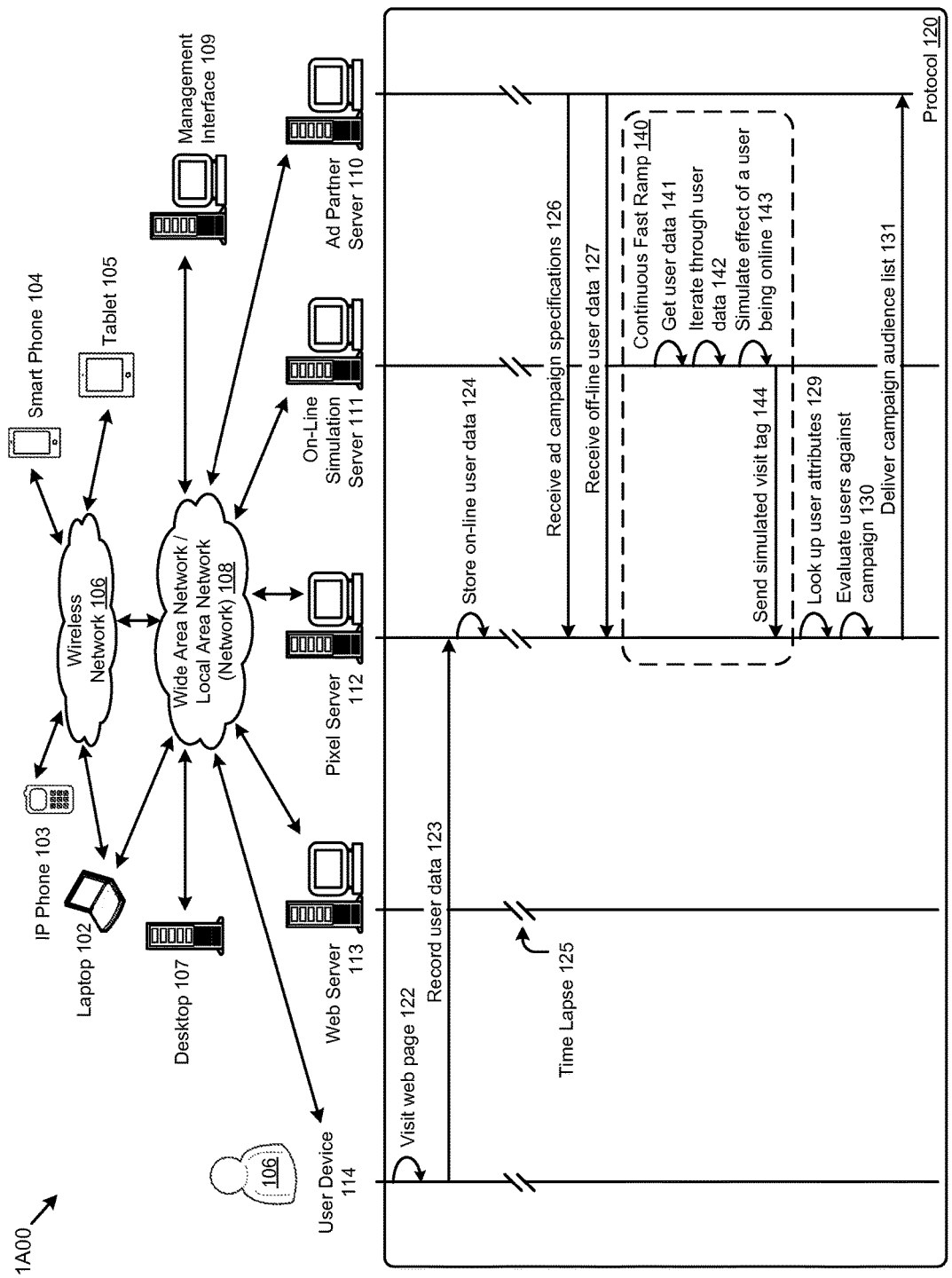
FIG. 1A depicts an environment that supports systems used for simulating user web page visits to generate an advertising campaign target audience list.

Some embodiments of the present disclosure address the problem of efficiently and quickly processing voluminous amounts of user data to enable a fast ramp-up of an advertising campaign and some embodiments are directed to approaches for rapid and continuous refreshing of aggregated online data for immediate deployment in an advertising campaign. More particularly, disclosed herein and in the accompanying figures are exemplary environments, methods, and systems for simulating user web page visits to generate an advertising campaign target audience list.

Overview

Advertisers want to prosecute advertising campaigns for specific purposes. Sometimes the purpose of such campaigns demands reaching target audiences sharing particular attributes (e.g., "women with a college degree in the 24-28 age range living in California", etc.) in order to improve the effectiveness of the campaign. In some cases, lists of audience members sharing such attributes can be compiled by querying online data recorded for those members (e.g., online users). In many cases, an online user web page visit will immediately trigger some action related to a campaign (e.g., check for a match or the user to the campaign target audience). In some cases, candidates for an advertising campaign may be defined by offline data recorded, for example, at a brick-and-mortar retail store (e.g., purchase records, rewards program registration, etc.). Such offline user data can be combined with online user data associated with the offline candidates to generate an audience list.

When an advertiser wants to prosecute a campaign, the advertiser often wants to ramp up the campaign quickly, reaching a maximum highly-targeted audience volume in a short period of time. However, not all of the potential candidates for the campaign will appear online at or near the time of the campaign launch to trigger their inclusion in the audience list. One legacy approach to build a larger audience for a new campaign is to pull from historical online user visit records to discover candidates for the campaign. However, generating an audience list from the large volume of visit records and user attributes at the time of launch can take a significant amount of time and not meet the fast ramp-up requirements of the advertiser. What is needed is a technique or techniques to process voluminous amounts of online and offline data, and to do it efficiently and quickly.

To address the aforementioned problem, the techniques described herein use systems and methods to continuously cycle through a set of historical online user visit records and update them such that a new online user visit is simulated. The simulated user web page visits can trigger including of offline data (e.g., in-store purchases behavior, kiosk visits, etc.) that can then be used by advertising campaigns to generate target audience lists based on freshly-updated user data. Since the user records are continuously being refreshed, these techniques enable a "continuous fast ramp" (CFR) of the advertising campaigns. The set of historical online user visit records can be bounded by a time window (e.g., 30 days).

Definitions

Some of the terms used in this description are defined below for easy reference. The presented terms and their respective definitions are not rigidly restricted to these definitions—a term may be further defined by the term's use within this disclosure.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A depicts an environment 1A00 that supports systems used for simulating user web page visits to generate an advertising campaign target audience list. As an option, one or more instances of environment 1A00 or any aspect thereof may be implemented in the context of the architecture and functionality of the embodiments described herein. Also, environment 1A00 or any aspect thereof may be implemented in any desired environment.

As shown in FIG. 1A, environment 1A00 comprises at least one instance of a simulation engine (e.g., online simulation server 111), at least one instance of pixel server 112, at least one instance of web server 113, at least one instance of ad partner server 110, at least one instance of management interface 109, and at least one instance of user device 114. User device 114 can represent one of a variety of other devices (e.g., a desktop computer 107, a laptop computer 102, an IP phone 103, a smart phone 104, a tablet 105, etc.) operated by a user 106. The aforementioned servers and devices can communicate through a network 108 (e.g., a wide area network (WAN), a local area network (LAN), etc.). A protocol 120 depicts operations and communications on and among user device 114, web server 113, pixel server 112, online simulation server 111, and ad partner server 110.

The aforementioned servers and devices in environment 1A00 are designed and configured to enable a user at user device 114 to visit (e.g., browse) a web page (see operation 122) served by web server 113. While browsing the web page, various user data (e.g., user IDs, web page visit records, shopping preferences, etc.) can be recorded at pixel server 112 (see operation 123). Pixel server 112 can then store this online user data (see operation 124). After some time lapse 125, the online user data stored from the web page visit may be considered unusable with regard to an online advertising campaign. For example, a web page visit by a user occurring more than 30 days ago may be considered by an advertiser to be too old to trigger presentation of an ad to that user. Further, many cookies collecting such visit information and other information completely expire after 100 days. After time lapse 125, pixel server 112 can receive from ad partner server 110 a set of ad campaign specifications (see operation 126). Pixel server 112 can also receive offline user data from ad partner server 110 (see operation 127). Such offline user data can be collected, for example, by an ad partner through activity of the user at a physical (e.g., brick-and-mortar) retail store.

In order for the ad partner to still consider in its ad campaign the aforementioned web page visit by user 106 given time lapse 125, a continuous fast ramp 140 set of operations can be performed. The continuous fast ramp 140 allows a new ad campaign (e.g., based on specifications received in operation 126) to be ramped quickly by simulating new web page visits from previous visits (e.g., operation 122). Specifically, continuous fast ramp 140 includes first getting both online and offline user data (see operation 141) at online simulation server 111. For example, offline data for a set of users provided by an ad partner can be matched against online user profile data for each user. Online simulation server 111 will then iterate through the user data (see operation 142) and simulate that the users are online (see operation 143). For example, an online visit can be simulated by creating a tag (e.g., HTTP call) for pixel server 112 that appears as if it were fired from user device 114 or web server 113. Online simulation server 111 will then send the simulated visit tag (see operation 144) to pixel server 112. Pixel server 112 will receive the information and look up the user attributes (see operation 129) to evaluate the user against existing ad campaigns (see operation 130). For example, a user may have in its user profile a category of "in-market/travel/air travel/economy" which will be tested against the campaign specifications to determine if the user should be included in the campaign audience list. Online simulation server 111 will then deliver the campaign audience list to ad partner server 110 (see operation 131).

Figure 1B:
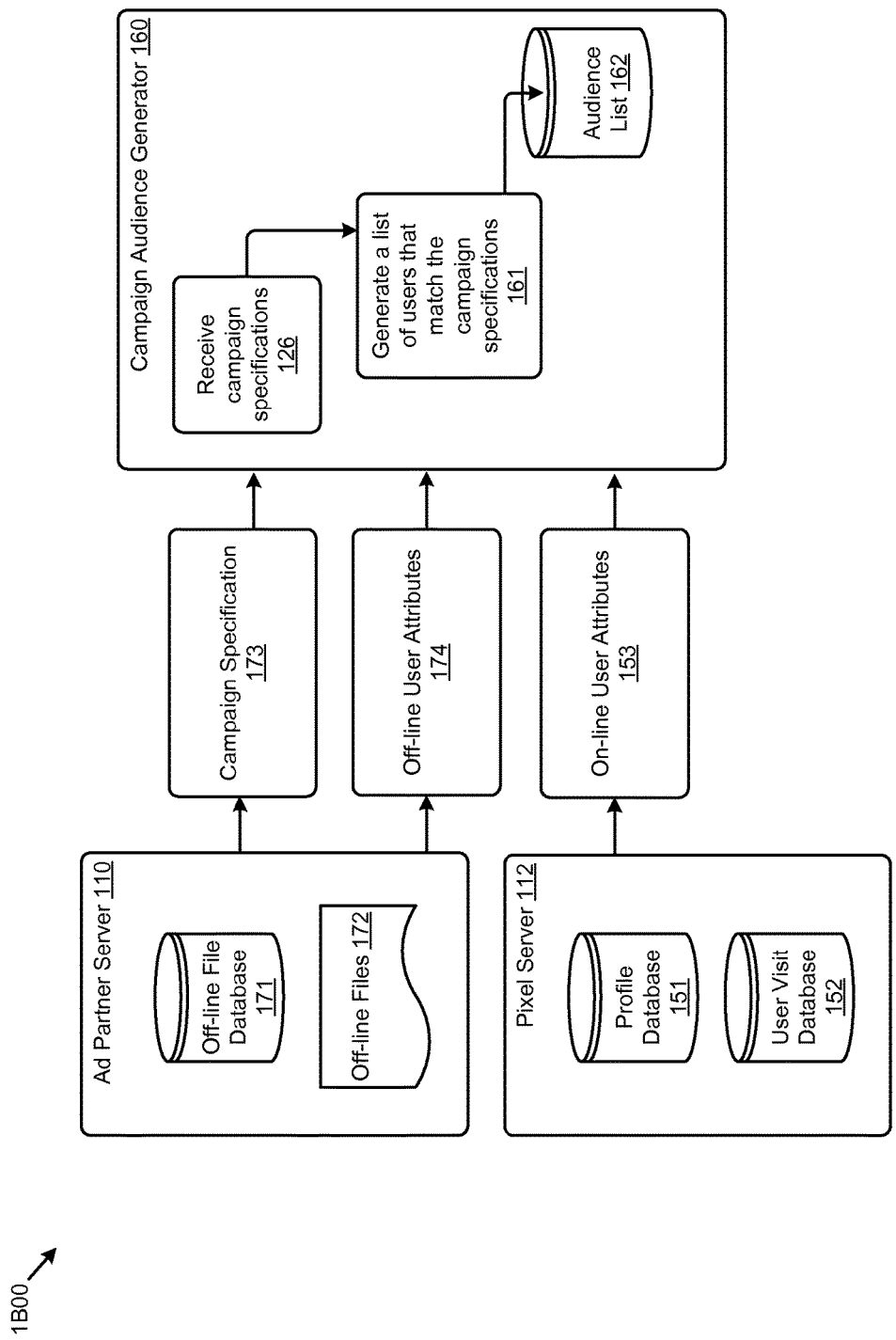
FIG. 1B depicts a system used to generate an advertising campaign target audience list.

FIG. 1B depicts a system 1B00 used to generate an advertising campaign target audience list. In the embodiment of FIG. 1B, system 1B00 comprises ad partner server 110 and pixel server 112 from environment 1A00, and a campaign audience generator 160. Campaign audience generator 160 can operate on one or more of the servers (e.g., pixel server 112) and devices shown in environment 1A00 or another computing system. As shown in system 1B00, an advertiser (e.g., a brick-and-mortar client) can have instances of an offline file database 171 and offline files 172. For example, offline files 172 can include information from one or more users collected from various offline activities (e.g., retail store purchases, rewards program registration, etc.), and offline file database 171 can store all or a portion of offline files 172. The advertiser can also create and deliver a campaign specification 173, along with an instance of offline user attributes 174 (e.g., selected from offline file database), to campaign audience generator 160. Further, pixel server 112 can have a profile database 151 storing online user attributes (e.g., categories, interests, etc.), and a user visit database 152 (e.g., comprising user IDs) for storing online web page visit information (e.g., log files, URLs, timestamps, IP addresses, etc.). Pixel server 112 can then make an instance of online user attributes 153 available to campaign audience generator 160. Campaign audience generator 160 is configured to receive campaign specifications (see operation 126) and generate a list of users that match the campaign specifications (see operation 161). Specifically, campaign audience generator 160 will use campaign specification 173 to evaluate offline user attributes 174 and online user attributes 153 to determine and store an audience list 162.

An audience list can comprise a collection of user IDs, where at least some of the user attributes of a given user correspond to the campaign specification. As used herein, a user ID can be any unique identifier that can be used to access aspects of that user. Strictly as examples, a user ID can be a name or an email alias, or a hashed email alias, or a device ID that corresponds to a device used by a user, or a pointer, or an identifier that is formed from a collection of attributes ascribed to a particular user. A user ID can be generated by the user, or can be provided by a third-party or can be formed using any one or more algorithms. A user ID can refer uniquely to a particular individual. In some situations, a user ID can refer to a set of users that share one or more user attributes (e.g., demographics or interests).

Advertisers often want to consider a large corpus of candidates when determining a target audience, and in some cases an advertiser would want to consider as candidates (e.g., subject to a campaign specification) web page visitors going back in time. However, advertisers also know that using information that is not current may impact the effectiveness of their campaign, particularly for newly created campaigns. As a specific example, an advertiser might want to look at a wide window of historical data (e.g., earlier-captured web page visits) to increase the corpus of audience candidates, while being conscientious to select targets only when the visit or candidate corresponding to the visit matches the specifications of the current campaign.

FIG. 1C1 depicts a flow 1C100 for generating an advertising campaign target audience list. As an option, one or more instances of flow 1C100 or any aspect thereof may be implemented in the context of the architecture and functionality of the embodiments described herein. Also, flow 1C100 or any aspect thereof may be implemented in any desired environment.

Flow 1C100 comprises a user data receiving module 150, an offline file database 171, and a campaign audience generator 160 from system 1B00. In some embodiments, user data receiving module 150 can operate at pixel server 112. Specifically, user data receiving module 150 can record user data (see operation 123) and store user profile information (e.g., user IDs, timestamps, user categories, user interests, etc.) within profile database 151, and user visit information (e.g., log files, URLs, timestamps, IP addresses, etc.) within user visit database 152.

Certain aspects of statistics extraction from arbitrary advertising audiences in some embodiments of the present application are related to material disclosed in U.S. patent application Ser. No. 12/860,789, entitled "REAL-TIME STATISTICS EXTRACTION FROM ARBITRARY ADVERTISING AUDIENCES" filed on Aug. 20, 2010, the content of which is incorporated by reference in its entirety in this application.

Consider the situation where a brick-and-mortar retailer has some form of offline information of their customers (e.g., names, email addresses, etc.). Further consider that the retailer would want to target their customers whenever such a customer is online. Following the embodiment of FIG. 1C1, the customer offline information can be stored in offline file database 171 and provided to campaign audience generator 160. Campaign audience generator 160 can receive campaign specifications from the retailer (see operation 126) and match the customer offline information to online information from profile database 151 and user visit database 152 to generate a list of users that match the campaign specifications (see operation 161). For example, a customer can be selected or rejected based on the customer's interests as they pertain to a targeted campaign. The customer's interests can be known by any means (e.g., from offline information or online information), however in exemplary cases, the customer's interests are determined in part by the occurrence or occurrences of a customer visiting one or more web pages (e.g., a travel website).

As earlier indicated, a portion of the contents of user visit database 152 can age over time (see time lapse 125), and may become stale. For example, a given user that has not visited a particular web page (e.g., www.travel.com) within a time window (e.g., the last 30 days) specified in an online ad campaign, will not be considered for that campaign (e.g., included in audience list 162) until the user visits that particular web page again (e.g., a revisit). Advertisers, however, want to reach the largest possible audience in the shortest amount of time when introducing a new campaign (e.g., a "fast ramp" of the campaign). This combination of demands can be addressed by embodiments that simulate web page visits such as are introduced and discussed in the following FIG. 1 C2.

FIG. 1C2 depicts a flow 1C200 for simulating user web page visits to generate an advertising campaign target audience list. As an option, one or more instances of flow 1C200 or any aspect thereof may be implemented in the context of the architecture and functionality of the embodiments described herein. Also, flow 1C200 or any aspect thereof may be implemented in any desired environment.

The depiction of FIG. 1C2 includes that which is described in FIG. 1C1 with the addition of a set of operations performed by a continuous fast ramp driver 180 that will continuously cycle through batches of user visits (see operation 181) and simulate the occurrence of new user visits (see operation 182). The updated user visit record, along with user information from offline file database 171 and profile database 151, can then be made available to campaign audience generator 160 to generate a list of users that match the campaign specifications (see operation 161). By continuously simulating user visits, CFR driver 180 enables a large and relevant instance of audience list 162 for a given campaign to be generated in a short time period (e.g., a "fast ramp").

The shown architecture is efficient and scalable. In an exemplary embodiment, multiple instances of CFR driver 180 can be implemented on one or more servers (e.g., online simulation server 111) in order to enable cycling through an entire user visit corpus in a target time frame (e.g., 24 hours). Further, in some embodiments, continuously cycling through batches of user visits (see operation 181) can be facilitated by an ID queuing operation (e.g., a sub-process of operation 181) to prepare each batch of user visits. For example, the ID queuing operation can collect a next batch of visit records (e.g., 500 user IDs) that pertains to unique user IDs for which a new user visit has not been recently simulated. The ID queueing operation can also be constrained by a time window (e.g., 30 days) beyond which visit information is not considered. In this embodiment, for example, the next batch of 500 unique visits (e.g., unique user IDs) from the past 30 days is then used to simulate the occurrence of new user visits for each user ID (see operation 182). In some embodiments, the web page visit simulation operation results, in part, in a portion (e.g., timestamp) of the user's previous visit record to be updated. The queueing and batching capability of the ID queueing operation can further allow the simulation of the web page visits to be performed in parallel batches (e.g., on multiple servers). Further, campaign audience generator 160 can be configured such that the campaign match process (see operation 161) considers only users who already exist within profile database 151 that can be mapped (e.g., using an ID swap) to those in offline file database 171 or a portion thereof. The campaign match process can then iterate over a smaller mapped ID dataset to determine audience list 162, eliminating any match process time spent on unmapped IDs that are not candidates for the campaign. In some embodiments, one or more pixel servers (e.g., back end pixel servers) can be dedicated to the aforementioned flows. Allocation of dedicated pixel servers can improve the response time of the pixel servers by off-loading certain other processing (e.g., offline data onboarding).

FIG. 1D1 presents a logic flow 1D100 used for capturing profiles instead of simulating user web page visits to generate an advertising campaign target audience list. As an option, one or more instances of logic flow 1D100 or any aspect thereof may be implemented in the context of the architecture and functionality of the embodiments described herein. Also, logic flow 1D100 or any aspect thereof may be implemented in any desired environment.

In this embodiment, campaign specifications are received (see operation 126) and offline user data is received (see operation 127). In a set of subsequent operations an offline ramp 190 of the campaign is performed. Offline ramp 190 begins by matching offline users to campaign specifications when the users appear online (see operation 191). For example, a user can appear online when a tag fired from a visit to a particular web page is received by a pixel server. When a user appears online (e.g., visits a web page) then the attributes of the user are pulled from profile database 151 to test against the campaign specifications. If the online users meeting the campaign specifications are enough (see operation 192), then the list of users that match the campaign specifications is generated (see operation 161). If the number of matching users is not enough (e.g., to meet a target audience since for the campaign), then offline ramp 190 will wait for more candidates to appear online (see operation 193). As earlier indicated a technique is desired to produce an audience list (e.g., ramp) more quickly (e.g., without having to wait for user web page revisits). One such technique is presented in the following FIG. 1D2.

FIG. 1D2 presents a logic flow 1D200 used for simulating user web page visits to generate an advertising campaign target audience list. As an option, one or more instances of logic flow 1D200 or any aspect thereof may be implemented in the context of the architecture and functionality of the embodiments described herein. Also, the logic flow 1D200 or any aspect thereof may be implemented in any desired environment.

Logic flow 1D200 commences upon receiving campaign specifications (see operation 126) and then receiving offline user data (see operation 127). In some embodiments, the campaign specifications can include a time window (e.g., 30 days) that defines a relevant period of potentially interested candidates for the campaign. In a set of subsequent operations a continuous fast ramp 140 of the campaign is performed. Continuous fast ramp 140 begins by iterating through a selected time window (e.g., 30 days) of user visits (see operation 181) pulled from user visit database 152. For example, the user visits pulled from user visit database 152 can be selected only for those user IDs matching the user IDs of the offline user data received (see operation 127). For each visit pertaining to a unique user ID the occurrence of a new user visit will be simulated (see operation 182), including, in part, updating various attributes (e.g., timestamp) of a user's visit record. The operations within continuous fast ramp 140 will loop continuously such that simulated and updated visit information remains current for other processes and operations. Specifically, logic flow 1D200 continues to assemble other active campaigns into a set (see operation 148). For example, new campaign specifications can be received and applied against an updated set of simulated web page visits produced by continuous fast ramp 140. More specifically, a list of users whose attributes from profile database 151 match the campaign specifications can be generated (see operation 161).

FIG. 2A1 is a block diagram of a system 2A100 for generating a database of historical user visits to generate an advertising campaign target audience list. As an option, one or more instances of system 2A100 or any aspect thereof may be implemented in the context of the architecture and functionality of the embodiments described herein. Also, the system 2A100 or any aspect thereof may be implemented in any desired environment.

As shown, pixel server 112 is configured to receive data from an instance of campaigns 210 and offline file database 171, and send and receive data to and from profile database 151 and user visit database 152. In some embodiments, offline database 171 can store one or more instances of offline files 172. In particular, pixel server 112 stores user visits into user visit database 152 and is configured to query or otherwise access the stored user visits on demand. Strictly as one scenario, user 106 may visit a web page using user device 114 (e.g., laptop computer 102) and browse. The web page content might include a beacon (e.g., HTTP call, etc.) that sends a message to pixel server 112 to record an online visit 202 within user visit database 152. The message can include a timestamp to record the visit date and time, and a URL to record the visit web page location, both of which can be stored in a visit record. Other information (e.g., device operating system, IP address, etc.) can also be included in the message and visit record.

Further, pixel server 112 can respond to the beacon with content (e.g., tags, scripts, etc.) that launch one or more other processes to retrieve various visit and other information (e.g., user attributes, interests, etc.). For example, the content of the beacon might invoke an update by a third party of a cookie for user 106. User attribute data received and/or accessible by pixel server 112 from online visit 202 can be stored within profile database 151 and compared against campaigns 210 to forward user match information to a data delivery module 220. Data delivery module 220 can deliver one or more instances of audience list 162 to various ad partners (e.g., campaign owners). In some embodiments, data delivery module 220 can be implemented as part of an asynchronous targeting service or a server-side data transfer service.

FIG. 2A2 is a block diagram of a system 2A200 for iterating through a time window of historical user visits to simulate user web page visits to generate an advertising campaign target audience list. As an option, one or more instances of system 2A200 or any aspect thereof may be implemented in the context of the architecture and functionality of the embodiments described herein. Also, the system 2A200 or any aspect thereof may be implemented in any desired environment.

System 2A200 depicts the user 106 and user device 114 of system 2A100 being replaced with an instance of online simulation server 111. Online simulation server 111 eliminates the need to wait for online visit 202 in system 2A100 by continuously providing simulated user web page visits to pixel server 112. Specifically, online simulation server 111 includes an instance of CFR driver 180, an ID queueing module 230, and one or more instances of a user visit hash table 231. More specifically, user visit database 152 can make user visit records available to ID queueing module 230 in the form of user visit hash table 231. For example, user visit hash table 231 can comprise data that represents a collection of user visits from the past 30 days. ID queueing module 230 can then prepare a set or batch of user visits to be processed by CFR driver 180. For example, ID queueing module 230 can select the next 500 records in a continuous sequence through the collection of user visits, only the visit records pertaining to a predetermined set of user IDs (e.g., external IDs from an offline file), only the visit records from unique or non-redundant user IDs, or any combination of these, and the like. CFR driver 180 can then simulate an online web page visit from each selected user ID by sending a simulated beacon to pixel server 112. For example, a user that visited a web page (e.g., www.example.com) 20 days ago will have a simulated beacon generated and sent by CFR driver 180 that appears as if the user revisited the web page (e.g., www.example.com). Pixel server 112 will receive the content of the beacon as described in FIG. 2A1, allowing users to be immediately selected for various ad campaigns without having to wait for them to revisit the web page.

In some embodiments, the operations and modules of online simulation server 111 can be implemented across multiple servers. Specifically, ID queueing module 230 may require multiple servers to process large instances of user visit database 152. Such an architecture as described herein can have many advantages, including reduction of double-hits (e.g., where a user ID appears multiple times across a series of user visit iterations); reduction in the length of wait queues; selective iteration through a large inventory of visit records over a specified time period (e.g., over the past 30 days); and fast access to a large inventory of visit records (e.g., using the hash tables).

Figure 2B:
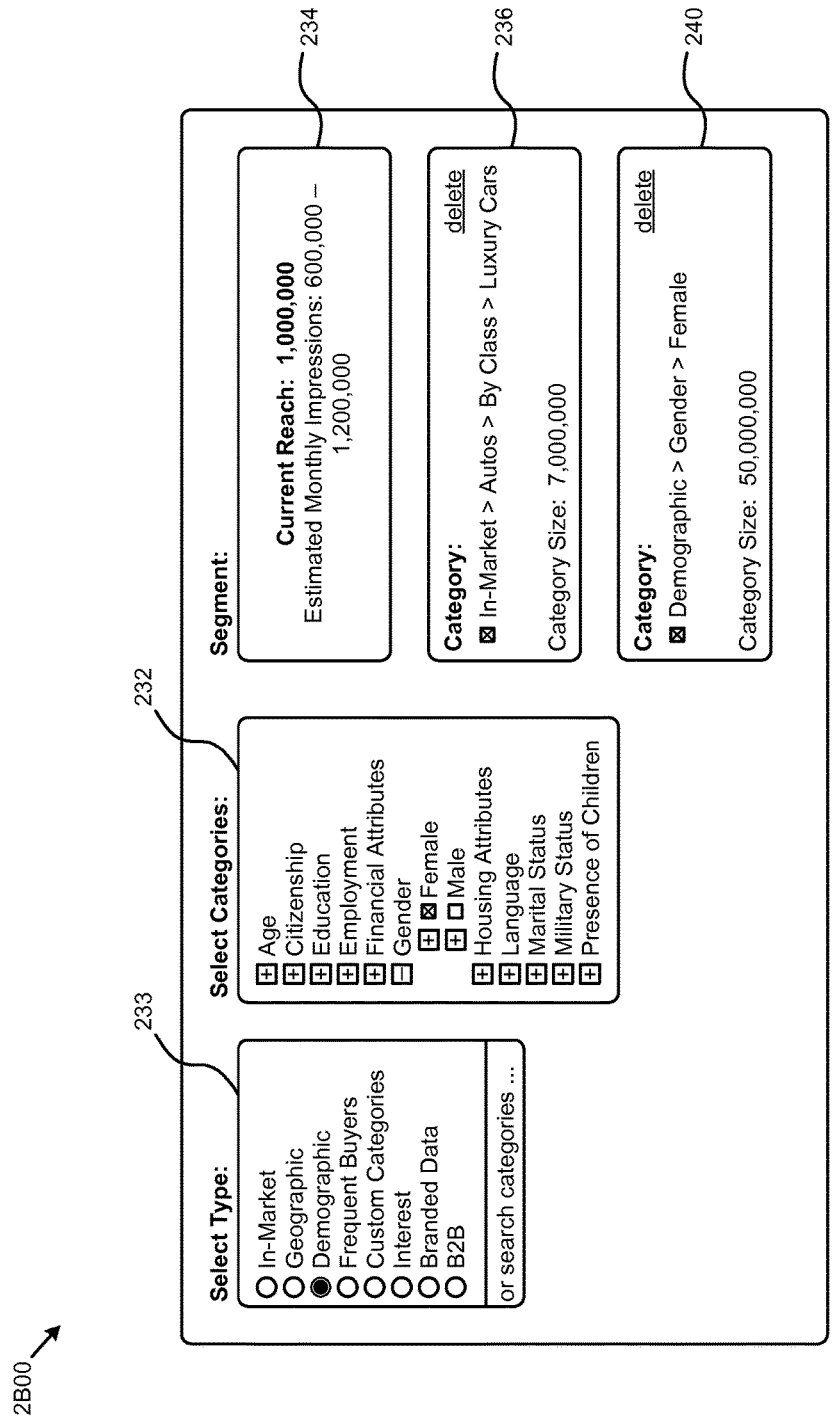
FIG. 2B presents a campaign specification interface, according to some embodiments.

FIG. 2B presents a campaign specification interface 2B00. As an option, one or more instances of campaign specification interface 2B00 or any aspect thereof may be implemented in the context of the architecture and functionality of the embodiments described herein. Also, campaign specification interface 2B00 or any aspect thereof may be implemented in any desired environment.

As shown in FIG. 2B, campaign specification interface 2B00 includes various controls, dialogs, and other user interface elements to enable an ad partner to specify the requirements for a campaign. In some embodiments, campaign specification interface 2B00 can be implemented on management interface 109 of environment 1A00. Specifically, the interface elements of campaign specification interface 2B00 may include a "Select Type" control 233 that enables an ad partner to select one or more types of categories to include in the campaign. Such types of categories may include, but are not limited to, in-market, geographic, demographic, frequent buyers, custom categories, interest, branded data, business-to-business (B2B), and the like. Selection of a category type through "Select Type" control 233 may include selection of a radio button or other control type. In the example shown, the ad partner has selected the "Demographic" category type. In some embodiments, "Select Type" control 233 may also include a dialog or other control to enable the ad partner to search for categories and/or category types.

Campaign specification interface 2B00 may further include a "Select Categories" control 232. In some embodiments, "Select Categories" control 232 may present a list of categories based on the category type selected through "Select Type" control 233. In the example shown, the ad partner has selected the "Demographic" category type through "Select Type" control 233, and "Select Categories" control 232 has been populated with a list of categories that correspond to the "Demographic" category type (e.g., categories for age, citizenship, education, employment, and the like). The ad partner may then select one or more categories from this list to be included in the campaign. In some embodiments, categories may be presented in a hierarchical structure as a listing of categories, subcategories, sub-subcategories, and so forth. Such a hierarchy of categories may be presented to the ad partner in a tree structure or the like. For example, as shown in the figure, the ad partner has expanded the "Gender" category to expose two subcategories: "Male" and "Female". The ad partner has further selected the "Female" subcategory for inclusion in the query.

Campaign specification interface 2B00 may also include elements that display the campaign specifications as the ad partner adds, removes and/or otherwise modifies the specifications. For example, a first element 236 and a second element 240 may depict two exemplary categories that the ad partner has selected to be included in the specifications through use of "Select Type" control 233 and "Select Categories" control 232. First element 236 shows that the ad partner has selected a first category of "Luxury Cars", specified in its hierarchical form as category type "In-Market" combined with category "Autos>By Class>Luxury Cars". Second element 240 shows that the ad partner has further selected a second category of "Female", specified in its hierarchical form as category type "Demographic" combined with category "Gender>Female". In some embodiments, campaign specification interface 2B00 may also present a category size for selected categories. For example, the category size may be based on an analysis of historical data and represent the size of an audience for a given category over a given period of time (e.g., the last month). For example, first element 236 includes a determined category size of 7,000,000 and second element 240 includes a determined category size of 50,000,000.

Once the campaign has been specified, a third element 234 can display a current reach for the campaign. In some embodiments, this current reach may be a historical audience volume corresponding to the current campaign specification, provided as a retrospective analysis to the ad partner. For example, as shown in FIG. 2B, third element 234 shows a current reach of 1,000,000 in audience volume, indicating that a campaign using the current specification would have historically reached an audience volume of 1,000,000 when run. Third element 234 may further display "Estimated Monthly Impressions" based on an audience volume prediction for a future time period. The predicted audience volume may be provided to the ad partner as a number of users that are predicted to be reached by a campaign that uses the current specifications for a determined future time period and/or a range of an estimated number of users predicted to be reached. Such a prediction may be based on an analysis of stored historical data. For example, as shown in FIG. 2B, third element 234 includes "Estimated Monthly Impressions" as a range of 600,000 to 1,200,000, indicating that a campaign using the current specifications is estimated to reach a predicted audience volume within this range if run during a certain future time period. In some embodiments, the "Current Reach" and "Estimated Monthly Impressions" numbers may be provided and/or updated to the ad partner in real-time as the ad partner specifies and/or modifies the specifications, respectively, such that the ad partner will see the predicted audience volume and/or retrospective audience volume that would be reached by a campaign using the specifications.

Figure 2C:
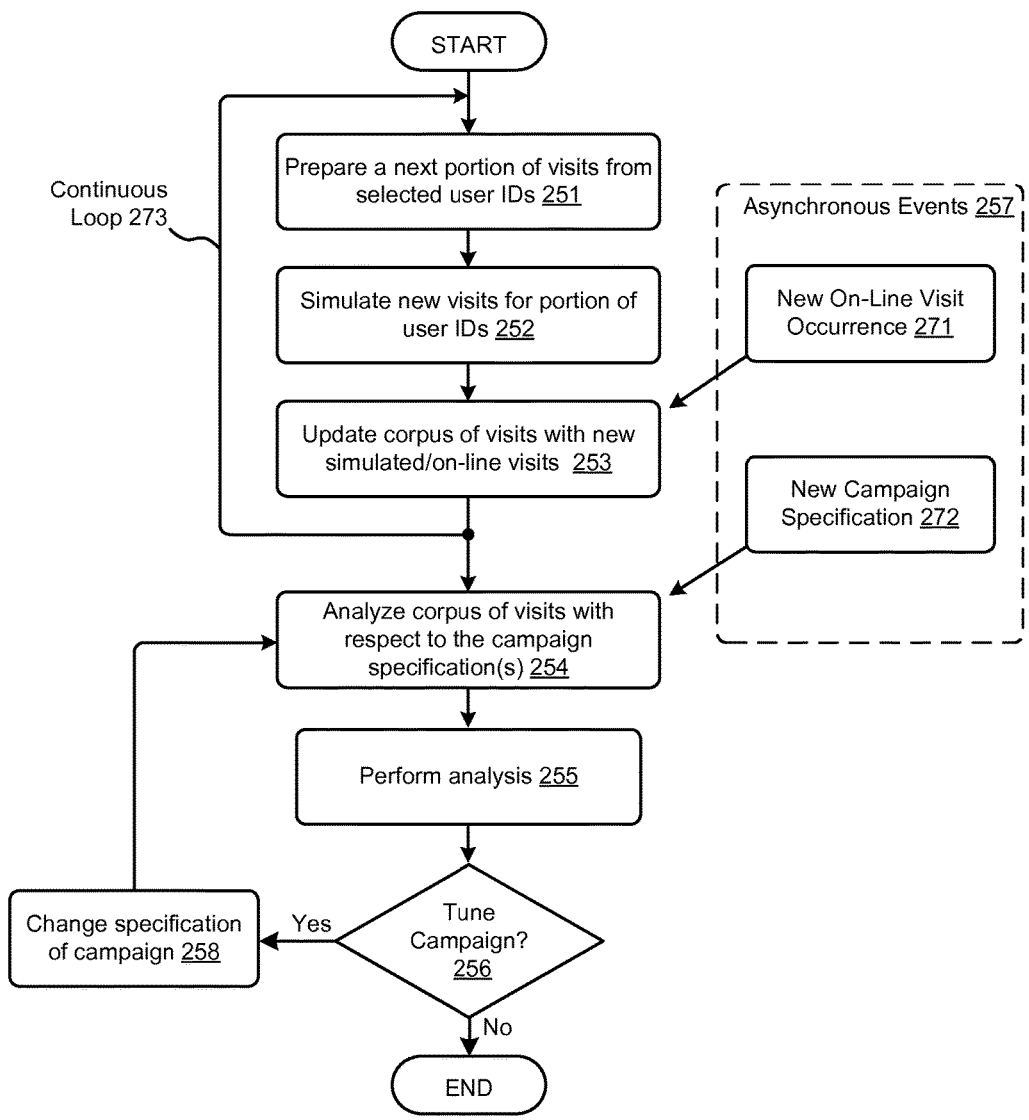
FIG. 2C presents a flow of operations for tuning a campaign in systems for simulating user web page visits to generate an advertising campaign target audience list, according to one embodiment.

FIG. 2C presents a flow 2C00 of operations for tuning a campaign in systems for simulating user web page visits to generate an advertising campaign target audience list, according to one embodiment. As an option, flow 2C00 or any aspect thereof may be implemented in the context of the architecture and functionality of the embodiments described herein. Also, flow 2C00 or any aspect thereof may be implemented in any desired environment.

The embodiment of flow 2C00 iterates through a portion of web page visit records for a set of user IDs, and in each iteration, new web page visits can be simulated. Using the updated web page visit records, analyses of various sorts (e.g., campaign specification matching) can then be performed on the users and a campaign can be tuned. Specifically, flow 2C00 commences with preparing a next portion of web page visit records for a selected set of user IDs (see operation 251) from an entire corpus of visits (e.g., stored in an instance of user visit database 152), and then simulating new web page visits for a portion of those user IDs (see operation 252). In some embodiments, the next portion of visit records can be selected based on a match with offline user IDs, a historical time window (e.g., last 30 days), a match with certain aspects of an ad campaign (e.g., IP address location), and the like. In some cases, a new web page visit is not simulated for a particular visit record or user ID (e.g., duplicate user ID, recent timestamp, etc.). The corpus of web page visit records can then be updated with the simulated new visits and one or more instances of a new online visit occurrence 271 that may have occurred (see operation 253) during the process. This first set of operations (see operation 251, operation 252, and operation 253) can be continuously executed through a continuous loop 273, continuously cycling through all or a portion of the entire corpus of visits.

Asynchronously, new online visits may occur and be processed. Given an updated corpus of visits or portion of visits, flow 2C00 can continue to analyze a corpus of visits with respect to various campaign specifications (see operation 254). Since the corpus of visits is being continuously updated (see continuous loop 273 and new online visit occurrences 271 within the asynchronous events 257), one or more instances of a new campaign specification 272 can be received by flow 2C00 and be quickly ramped. In some embodiments, campaigns can also be tuned using flow 2C00 by performing an analysis of various campaign metrics (see operation 255) such as current reach, estimated monthly impressions, and the like. If the campaign owner (e.g., ad partner) wants to tune the campaign (see operation 256), then one or more specifications of the campaign can be changed (see operation 258) and the campaign can be re-analyzed (see operation 254 and new campaign specification 272 within the asynchronous events 257).

Some embodiments of campaign audience generator 160 may enable an advertiser to specify a query defining an audience which is to be used to determine one or more other audiences that are correlated with the defined audience. Such a query may be a Boolean combination of various audience categories. Employing the advertiser-specified query and advertiser-specified statistics (e.g., metrics), a set of audiences and/or computed statistics may be provided to the requestor in near-real time based on analysis of audience data. Embodiments may also enable a user to tune the audience size through modification of the query in one or more iterations until the advertiser-requestor is satisfied with the calculated audience list. Parallel processing of data retrieval and/or analysis of data by a cluster of servers may enable audience calculation events to be generated in real time or near-real time.

Figure 2D:
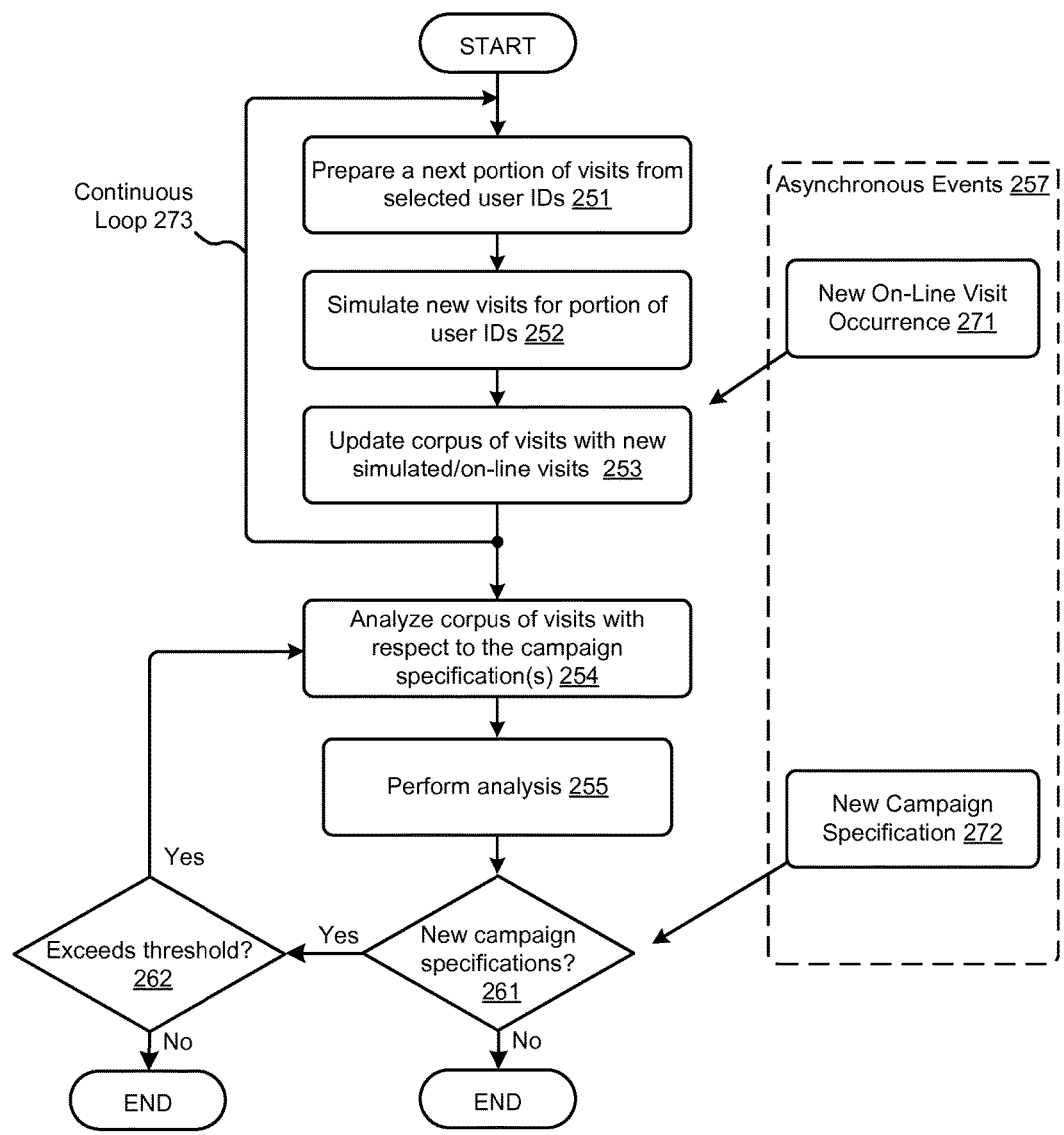
FIG. 2D presents a flow of operations for receiving updated campaign specifications in systems for simulating user web page visits to generate an advertising campaign target audience list, according to one embodiment.

FIG. 2D presents a flow 2D00 of operations for receiving updated campaign specifications in systems for simulating user web page visits to generate an advertising campaign target audience list, according to some embodiments. As an option, flow 2D00 or any aspect thereof may be implemented in the context of the architecture and functionality of the embodiments described herein. Also, flow 2D00 or any aspect thereof may be implemented in any desired environment.

In some cases, new or updated campaign specifications may be introduced during the process of generating an advertising campaign target audience list using simulated user web page visits. Specifically, flow 2D00 commences with preparing a next portion of web page visit records for a selected set of user IDs (see operation 251) from an entire corpus of visits (e.g., stored in an instance of user visit database 152), and then simulating new web page visits for a portion of those user IDs (see operation 252). In some embodiments, the next portion of visit records can be selected based on a match with offline user IDs, a historical time window (e.g., last 30 days), a match with certain aspects of an ad campaign (e.g., IP address location), and the like. In some cases, a new web page visit is not simulated for a particular visit record or user ID (e.g., duplicate user ID, recent timestamp, etc.). The corpus of web page visit records can then be updated with the simulated new visits and one or more instances of a new online visit that may have occurred (see operation 253) during the process. This first set of operations (see operation 251, operation 252, and operation 253) can be continuously executed through a continuous loop 273, continuously cycling through all or a portion of the entire corpus of visits. Given an updated corpus of visits or portion of visits, flow 2D00 can continue to analyze a corpus of visits with respect to various campaign specifications (see operation 254) and perform an analysis of the results (see operation 255) to determine if the campaign meets certain criteria (e.g., current reach, estimated monthly impressions, etc.). At this point, if one or more occurrences of a new campaign specification 272 were detected (see operation 261), then flow 2D00 can either use the results (e.g., audience list) based on the previous campaign specifications or analyze the corpus of visits against the new campaign specifications (e.g., repeat operation 254). Specifically, in one embodiment, flow 2D00 will determine if the values or characteristics of new or updated specifications from a new campaign exceed a given threshold (see operation 262). For example, if a new campaign specifies a new category such as "zip code=90210", and the previous campaign already had specified "residence=Beverly Hills", that change might not produce enough change in results (e.g., threshold of: "change in total reach"<20,000) that would warrant a processing loop (e.g., return to operation 254). In another case, the threshold may be exceeded and flow 2D00 would return to reformulate the campaign query and reprocess the audience list (e.g., see return to operation 254).

Figure 3:
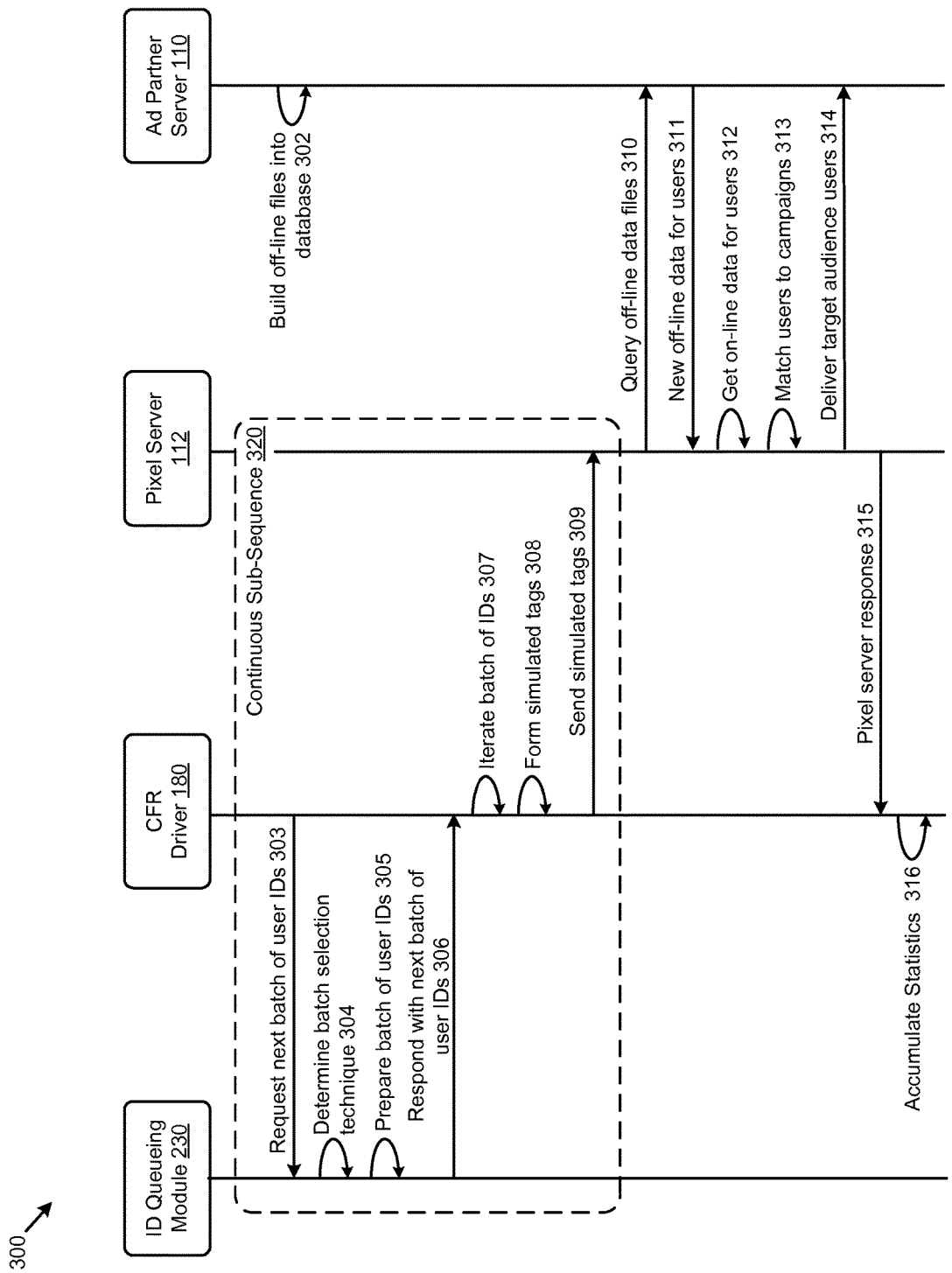
FIG. 3 presents a sequence diagram of a protocol used in systems for simulating user web page visits to generate an advertising campaign target audience list, according to one embodiment.

FIG. 3 presents a sequence diagram 300 of a protocol used in systems for simulating user web page visits to generate an advertising campaign target audience list. As an option, one or more instances of sequence diagram 300 or any aspect thereof may be implemented in the context of the architecture and functionality of the embodiments described herein. Also, sequence diagram 300 or any aspect thereof may be implemented in any desired environment.

Sequence diagram 300 comprises operational elements in the form of ID queueing module 230, CFR driver 180, pixel server 112, and ad partner server 110. In this embodiment, the operational elements commence the shown protocol as follows. Ad partner server 110 builds one or more offline files into a database (see operation 302). In performing the build, the offline files are checked for validity and processed in accordance with a schema to load into a database. The offline database can comprise a selected set of users with external user IDs and various associated offline attributes. Ad partner server 110 is configured such that upon a query for offline data files (see message 310), ad partner server 110 processes the request and returns new offline data pertaining to the users identified in the query (see message 311).

CFR driver 180 and ID queueing module 230 interact with a set of operations and messages that repeat within a continuous sub-sequence 320. In some embodiments, continuous sub-sequence 320 operates to continuously cycle through a given corpus of user IDs and associated web page visit records to simulate new web page visits for the purposes of fast ramping of current and future ad campaigns. Specifically, CFR driver 180 invokes an iteration of continuous sub-sequence 320 by requesting a next batch of user IDs from ID queueing module 230 (see message 303). ID queueing module 230 first determines a batch selection technique to be deployed (see operation 304). For example, ID queueing module 230 can base selection of the next batch on user ID matching to external offline IDs, historical time window of associated web page visits (e.g., last 30 days), avoidance of redundancy (e.g., no multiple user IDs in batch), and the like. The ID queueing module 230 then prepares successive batches of user IDs (see operation 305) and responds to CFR driver 180 with those user IDs (see message 306). CFR driver 180 will then iterate over a batch of user IDs (see operation 307) and form simulated tags (e.g., pixel server requests) for all or a portion of the user IDs (see operation 308). CFR driver 180 sends the simulated tags to pixel server 112 (see message 309). The tags formed by CFR driver 180 include content (e.g., user ID, current timestamp, flags, etc.) such that pixel server 112 can perform operations corresponding to the content (e.g., offline targeting).

Pixel server 112 is configured to recognize incoming messages (e.g., simulated messages) from CFR driver 180, and counts are handled accordingly (e.g., simulated visits are counted differently as compared to real online visits). In one embodiment and example, pixel server 112 can look up any new offline data (see message 310 and message 311) and any online data (see operation 312) associated with a user identified in a simulated tag to determine a match to one or more advertising campaigns (see operation 313). In this example, pixel server 112 is able to simulate that one or more users are online such that all or a portion of those users are eligible to be matched to one or more campaigns, as compared to waiting for the users to actually visit online. Once pixel server 112 determines the campaigns matches, the list of users comprising a target audience can be delivered (see operation 314) to one or more instances of ad partner server 110 (e.g., using server-side data transfer). Pixel server 112 can further calculate campaign statistics (e.g., win information, log files, tags per user, categories per user, etc.) and send it back to CFR driver 180 (see message 315) where the statistics can be accumulated (see operation 316) and delivered to various stakeholders (e.g., via email).

Figures 4A, 4B:
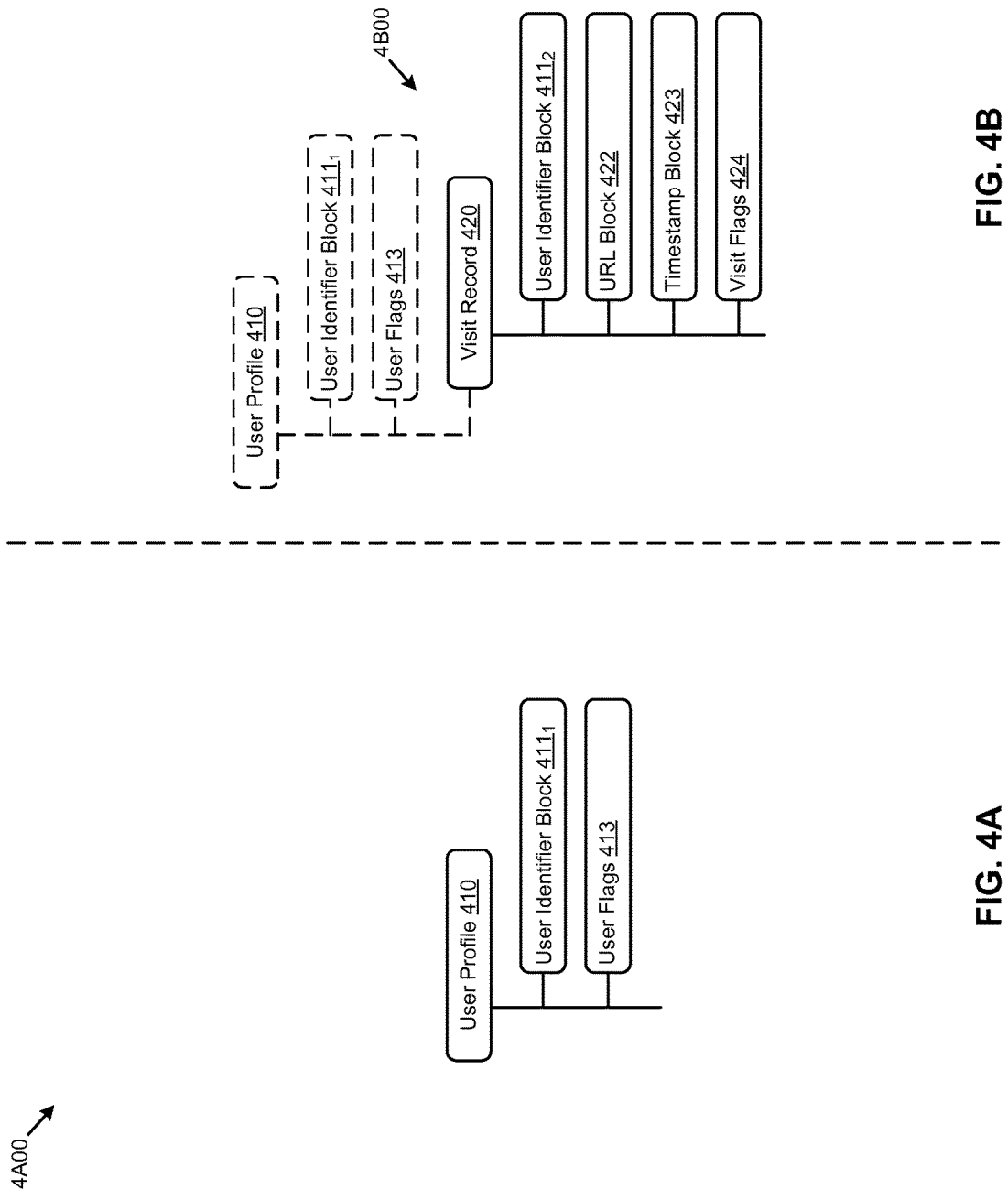
FIG. 4A and FIG. 4B illustrate data structures as used in systems for simulating user web page visits to generate an advertising campaign target audience list, according to one embodiment.

FIG. 4A and FIG. 4B illustrate data structures as used in systems for simulating user web page visits to generate an advertising campaign target audience list, according to one embodiment.

As shown in FIG. 4A, a profile data structure 4A00 describes a user profile 410, which in turn comprises a user identifier block $411_1$ and a set of user flags 413. User flags 413, for example, can include user categories (e.g., gender, interests, location, etc.) that can be used to test against campaign specifications to determine eligibility of a given user for a given campaign.

As shown in FIG. 4B, a visit data structure 4B00 describes a visit record 420, which in turn comprises constituent data structures such as a user identifier block $411_2$, a URL block 422, a timestamp block 423, and a set of visit flags 424. In an example, a simulated web page visit may generate a new instance of visit record 420 with a change to only timestamp block 423 as compared to the original instance of visit record 420 generated by a previous actual online visit. A visit record might be updated by updating any one or more of its constituent data structures.

Figure 5A:
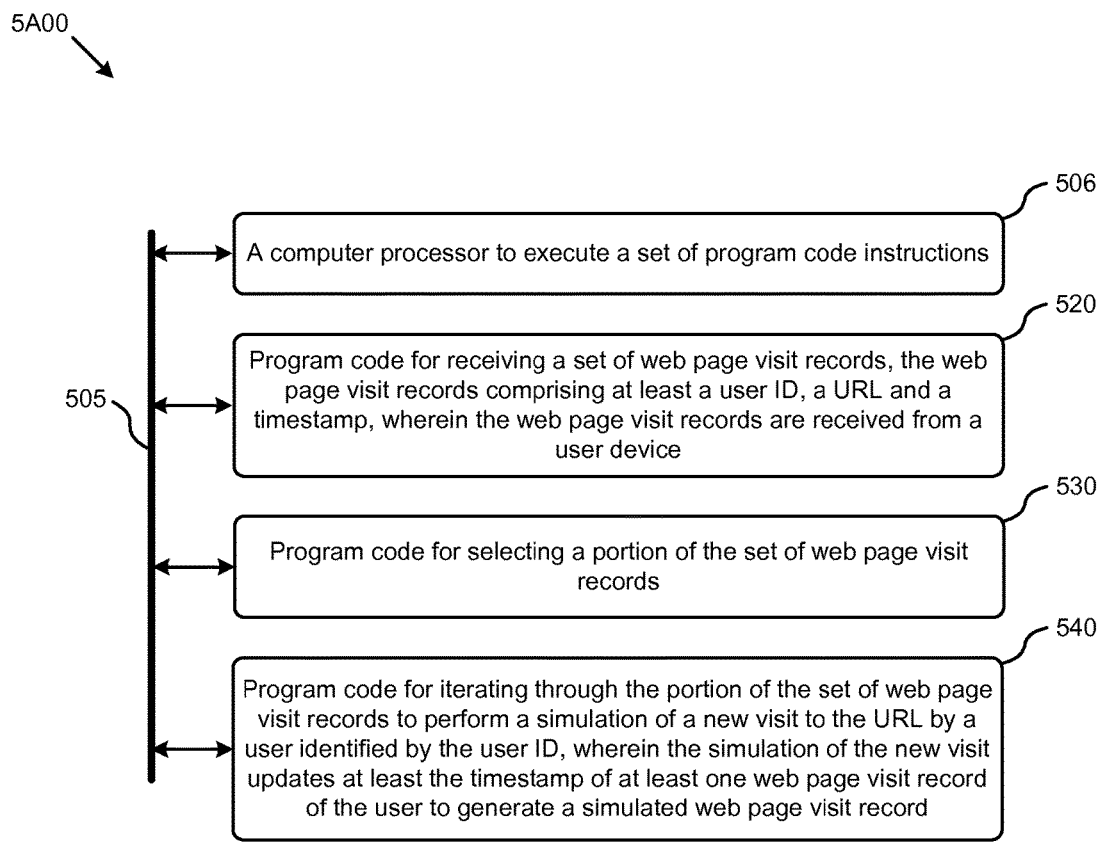
FIG. 5A is a block diagram of a system for implementing any of the herein-disclosed embodiments.

Additional Embodiments of the Disclosure
Additional Practical Application Examples FIG. 5A is a block diagram of a system 5A00 for implementing all or portions of any of the embodiments described herein. System 5A00 comprises at least one processor and at least one memory, the memory serving to store program instructions corresponding to the operations of the system. As shown, an operation can be implemented in whole or in part using program instructions accessible by a module. The modules are connected to a communication path 505, and any operation can communicate with other operations over communication path 505. The modules of the system can, individually or in combination, perform method operations within system 5A00. Any operations performed within system 5A00 may be performed in any order unless as may be specified in the claims.

The embodiment of FIG. 5A implements a portion of a computer system, shown as system 5A00, comprising a computer processor to execute a set of program code instructions (see module 506) and modules for accessing memory to hold program code instructions to perform: receiving a set of web page visit records, the web page visit records comprising at least a user ID, a URL and a timestamp, wherein the web page visit records are received from a user device (see module 520); selecting a portion of the set of web page visit records (see module 530); and iterating through the portion of the set of web page visit records to perform a simulation of a new visit to the URL by a user identified by the user ID, wherein the simulation of the new visit updates at least the timestamp of at least one web page visit record of the user to generate n simulated web page visit record (see module 540).

Figure 5B:
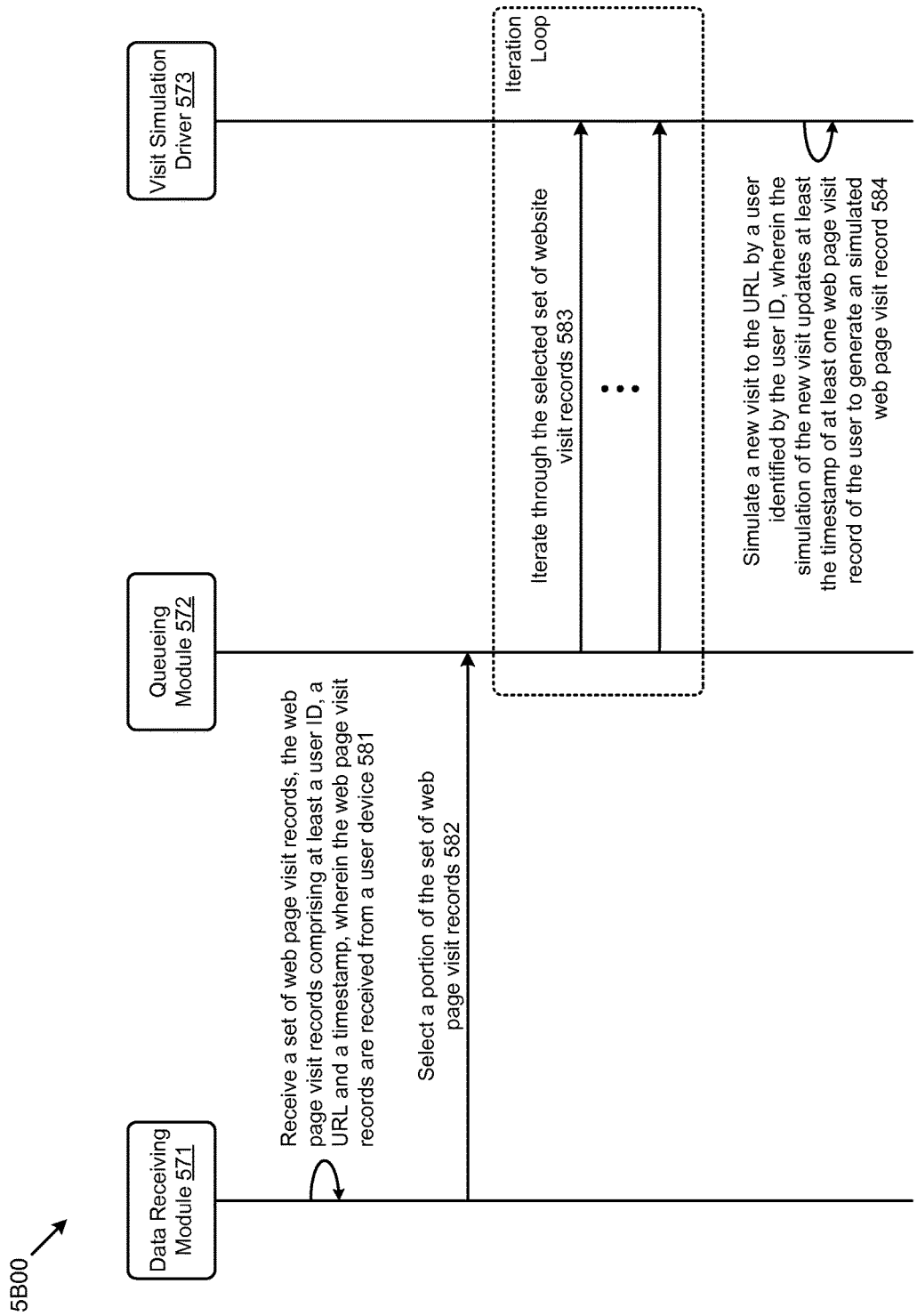
FIG. 5B is a block diagram of a protocol for implementing all or portions of any of the embodiments described herein.

FIG. 5B is a block diagram of a protocol 5B00 for simulating user web page visits to generate an advertising campaign target audience list. As an option, one or more instances of protocol 5B00 or any aspect thereof may be implemented in the context of the architecture and functionality of the embodiments described herein. Also, protocol 5B00 or any aspect thereof may be implemented in any desired environment.

The protocol 5B00 shown in FIG. 5B shows one embodiment of representative modules and flows for simulating user web page visits to generate an advertising campaign target audience list. Specifically, protocol 5B00 comprises a data receiving module 571 configured to perform one or more concurrent processes, at least one of the processes to perform includes receiving a set of web page visit records, the web page visit records comprising at least a user ID, a URL and a timestamp, wherein the web page visit records are received from a user device (see operation 581). The shown protocol 5B00 further comprises a queueing module 572 configured to perform one or more concurrent processes, at least one of the processes to perform includes selecting a portion of the set of web page visit records (see operation 582), and protocol 5B00 further comprises a visit simulation driver 573 configured to perform one or more concurrent processes, at least one of the processes to perform iterating through the portion of the set of web page visit records (see operation 583); and simulating a new visit to the URL by a user identified by the user ID, wherein the simulation of the new visit updates at least the timestamp of at least one web page visit record of the user to generate n simulated web page visit record (see operation 584).

System Architecture Overview
Additional System Architecture Examples

Figure 6A:
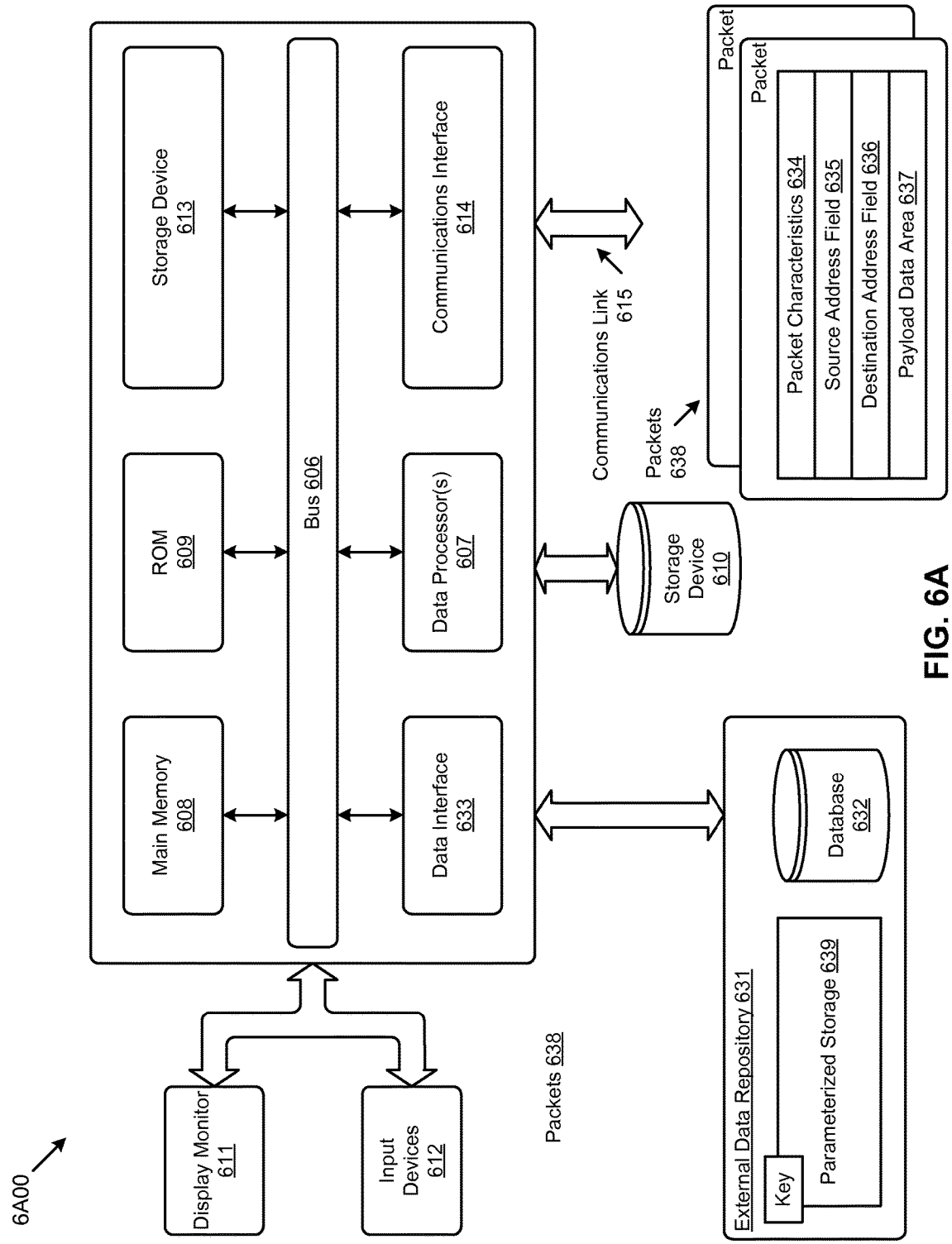
FIG. 6A, FIG. 6B, and FIG. 6C depict exemplary architectures of components suitable for implementing embodiments of the present disclosure, and/or for use in the herein-described environments.

FIG. 6A depicts a block diagram of an instance of a computer system 6A00 suitable for implementing embodiments of the present disclosure. Computer system 6A00 includes a bus 606 or other communication mechanism for communicating information, which interconnects subsystems and devices such as a processor 607, a system memory (e.g., main memory 608, or an area of random access memory RAM), a static storage device (e.g., ROM 609), a storage device 610 (e.g., magnetic or optical), a data interface 633, a communication interface 614 (e.g., PHY, MAC, Ethernet interface, modem, etc.), a display 611 (e.g., CRT or LCD), input devices 612 (e.g., keyboard, cursor control), and an external data repository 631.

According to an embodiment of the disclosure, computer system 6A00 performs specific operations by processor 607 executing one or more sequences of one or more instructions contained in system memory. Such instructions may be read into system memory from another computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based or can be formed using a combination of hardware and software that implements logic, and/or can carry out computations and/or processing steps using one or more processes and/or one or more tasks and/or one or more threads or any combination therefrom.

According to an embodiment of the disclosure, computer system 6A00 performs specific networking operations using one or more instances of communication interface 614. Instances of the communication interface 614 may comprise one or more networking ports that are configurable (e.g., pertaining to speed, protocol, physical layer characteristics, media access characteristics, etc.) and any particular instance of the communication interface 614 or port thereto can be configured differently from any other particular instance. Portions of a communication protocol can be carried out in whole or in part by any instance of the communication interface 614, and data (e.g., packets, data structures, bit fields, etc.) can be positioned in storage locations within communication interface 614, or within system memory, and such data can be accessed (e.g., using random access addressing, or using direct memory access DMA, etc.) by devices such as processor 607.

The communications link 615 can be configured to transmit (e.g., send, receive, signal, etc.) packets 638 comprising any organization of data items. The data items can comprise a payload data area 637, a destination address 636 (e.g., a destination IP address), a source address 635 (e.g., a source IP address), and can include various encodings or formatting of bit fields to populate the shown packet characteristics 634. In some cases the packet characteristics include a version identifier, a packet or payload length, a traffic class, a flow label, etc. In some cases the payload data area 637 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to processor 607 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data. Such data can be stored, for example, in any form of external data repository 631, which in turn can be formatted into any one or more storage areas, and which can comprise parameterized storage 639 accessible by a key (e.g., filename, table name, block address, offset address, etc.).

In an embodiment of the disclosure, execution of the sequences of instructions to practice the disclosure is performed by a single instance of the computer system 6A00. According to certain embodiments of the disclosure, two or more instances of computer system 6A00 coupled by a communications link 615 (e.g., LAN, PTSN, or wireless network) may perform the sequence of instructions required to practice embodiments of the disclosure using two or more instances of components of computer system 6A00.

The computer system 6A00 may transmit and receive messages, data, and instructions including programs (e.g., application code), through communications link 615 and communication interface 614. Received program code may be executed by processor 607 as it is received and/or stored in the shown storage device or in or upon any other non-volatile storage for later execution. Computer system 6A00 may communicate through a data interface 633 to a database 632 on an external data repository 631. Data items in a database can be accessed using a primary key (e.g., a relational database primary key). A module as used herein can be implemented using any mix of any portions of the system memory and any extent of hard-wired circuitry including hard-wired circuitry embodied as a processor 607. Some embodiments include one or more special-purpose hardware components (e.g., power control, logic, sensors, transducers, etc.), and some embodiments may include one or more state machines and/or combinational logic.

Figure 6B:
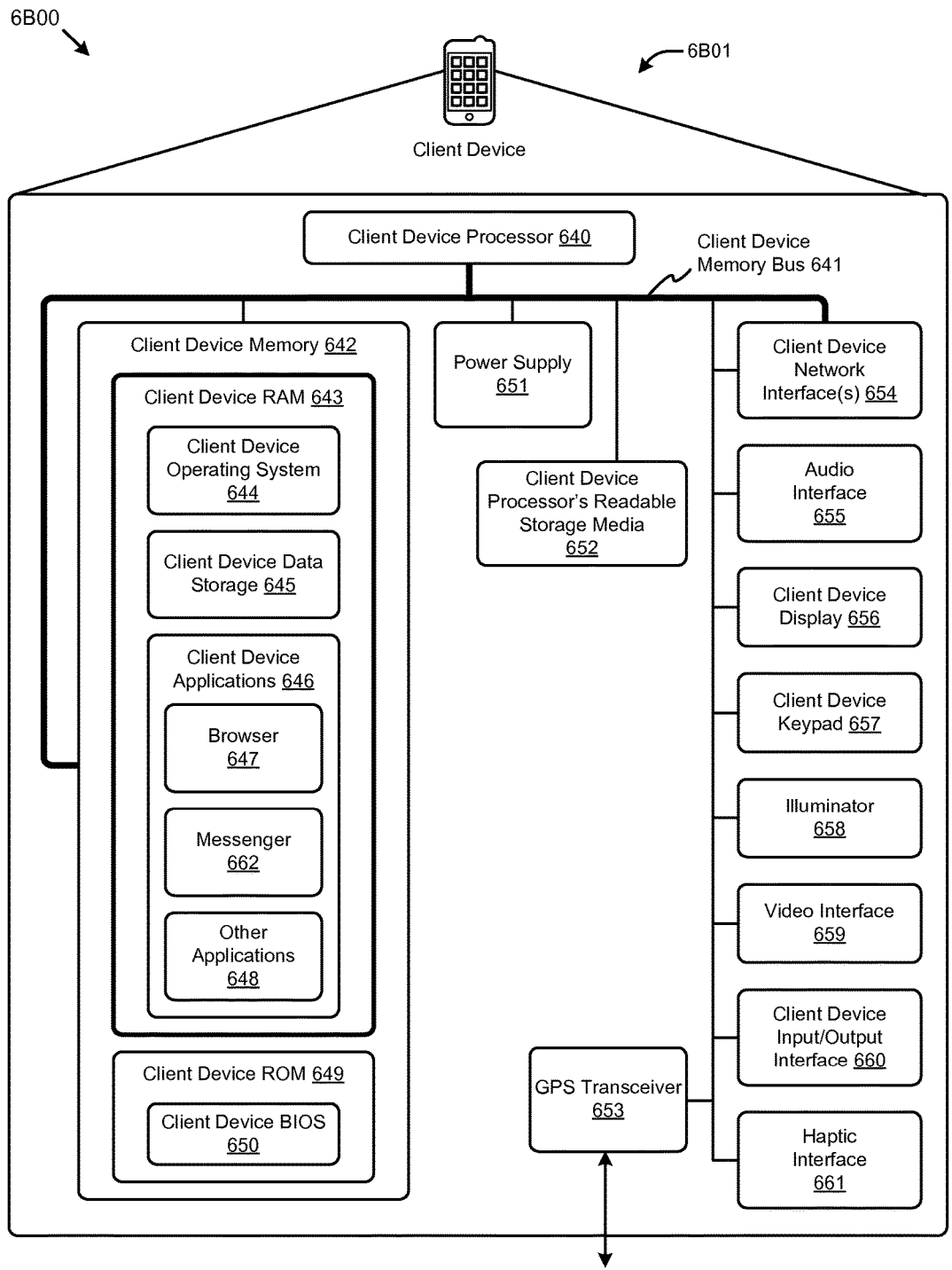

FIG. 6B depicts a block diagram 6B00 of an instance of a client device 6B01 that may be included in a system implementing instances of the herein-disclosed embodiments. Client device 6B01 may include many more or fewer components than those shown in FIG. 6B. Client device 6B01 may represent, for example, one embodiment of at least one of client devices as heretofore disclosed.

As shown in the figure, client device 6B01 includes a client device processor 640 in communication with a client device memory 642 via a client device memory bus 641. Client device 6B01 also includes a power supply 651, one or more client device network interfaces 654, an audio interface 655, a client device display 656, a client device keypad 657, an illuminator 658, a video interface 659, a client device input/output interface 660, a haptic interface 661, and a GPS transceiver 653 for global positioning services.

The power supply 651 provides power to client device 6B01. A rechargeable or non-rechargeable battery may be used to provide power. The power may also be provided by an external power source such as an AC adapter or a powered docking cradle that supplements and/or recharges a battery.

Client device 6B01 may optionally communicate with a base station, or directly with another computing device. A client device network interface 654 includes circuitry for coupling client device 6B01 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), short message service (SMS), general packet radio service (GPRS), wireless access protocol (WAP), ultra wide band (UWB), IEEE 802.16 Worldwide Interoperability for Microwave Access (WiMax), session initiated protocol/real-time transport protocol (SIP/RTP), or any of a variety of other wireless communication protocols. Client device network interface 654 is sometimes known as a transceiver, a transceiving device, or a network interface card (NIC).

An audio interface 655 is arranged to produce and receive audio signals such as the sound of a human voice. For example, audio interface 655 may be coupled to a speaker and microphone to enable telecommunication with others and/or generate an audio acknowledgement for some action.

A client device display 656 may be a liquid crystal display (LCD), gas plasma, light emitting diode (LED), or any other type of display used with a computing device. A client device display 656 may also include a touch sensitive screen arranged to receive input from an object such as a stylus or a digit from a human hand.

A client device keypad 657 may comprise any input device arranged to receive input from a user. For example, client device keypad 657 may include a push button numeric dial, or a keyboard. A client device keypad 657 may also include command buttons that are associated with selecting and sending images.

An illuminator 658 may provide a status indication and/or provide light. Illuminator 658 may remain active for specific periods of time or in response to events. For example, when the illuminator 658 is active, it may backlight the buttons on client device keypad 657 and stay on while the client device is powered. Also, the illuminator 658 may backlight these buttons in various patterns when particular actions are performed such as dialing another client device. An illuminator 658 may also cause light sources positioned within a transparent or translucent case of the client device to illuminate in response to actions.

A video interface 659 is arranged to capture video images such as a still photo, a video segment, an infrared video or the like. For example, the video interface 659 may be coupled to a digital video camera, a web-camera or the like. A video interface 659 may comprise a lens, an image sensor, and other electronics. Image sensors may include a complementary metal-oxide-semiconductor (CMOS) integrated circuit, charge-coupled device (CCD), or any other integrated circuit for sensing light.

Client device 6B01 also comprises a client device input/output interface 660 for communicating with external devices such as a headset, or other input or output devices not shown in FIG. 6B. The client device input/output interface 660 can use one or more communication technologies such as a USB, infrared, Bluetooth™ port or the like. A haptic interface 661 is arranged to as a human interface device (HID) to facilitate interaction with a user of a client device. Such interaction can include tactile feedback to a user of the client device. For example, the haptic interface 661 may be employed to vibrate client device 6B01 in a particular way (e.g., with a pattern or periodicity) and/or when interacting with another user.

A GPS transceiver 653 can determine the physical coordinates of client device 6B01 on the surface of the Earth. The GPS transceiver 653, in some embodiments, may be optional. The shown GPS transceiver 653 outputs a location such as a latitude value and a longitude value. However, the GPS transceiver 653 can also employ other geo-positioning mechanisms including, but not limited to, triangulation, assisted GPS (AGPS), enhanced observed time difference (E-OTD), cell identifier (CI), service area identifier (SAI), enhanced timing advance (ETA), base station subsystem (BSS) or the like, to determine the physical location of client device 6B01 on the surface of the Earth. It is understood that under different conditions, a GPS transceiver 653 can determine a physical location within millimeters for client device 6B01; and in other cases, the determined physical location may be less precise such as within a meter or significantly greater distances. In one embodiment, however, the client device 6B01 may provide other information that may be employed to determine a physical location of the device including, for example, a media access control (MAC) address, IP address, IP port identifier, or the like.

The client device memory 642 includes random access memory 643, read-only memory 649, and other storage means. The client device memory 642 illustrates an example of computer readable storage media (devices) for storage of information such as computer readable instructions, data structures, program modules or other data. The client device memory 642 stores a basic input/output system (BIOS) in the embodiment of client device BIOS 650 for controlling low-level operation of client device 6B01. The memory also stores an operating system 644 for controlling the operation of client device 6B01. It will be appreciated that this component may include a general-purpose operating system such as a version of UNIX, or LINUX™, or a specialized client communication operating system such as Microsoft Corporation's Windows Mobile™, Apple Corporation's iOS™ Google Corporation's Android™, or the Symbian® operating system. The operating system may include, or interface with a Java virtual machine module that enables control of hardware components and/or operating system operations via Java application programs.

The client device memory 642 further includes one or more instances of client device data storage 645, which can be used by client device 6B01 to store, among other things, client device applications 646 and/or other data. For example, client device data storage 645 may also be employed to store information that describes various capabilities of client device 6B01. The information may then be provided to another device based on any of a variety of events including being sent as part of a header during a communication, sent upon request or the like. Client device data storage 645 may also be employed to store social networking information including address books, buddy lists, aliases, user profile information or the like. Further, client device data storage 645 may also store messages, web page content, or any of a variety of content (e.g., received content, user generated content, etc.).

At least a portion of the information may also be stored on any component or network device including, but not limited, to a client device processor's readable storage media 652, a disk drive or other computer readable storage devices within client device 6B01, etc.

An instance of a client device processor's readable storage media 652 may include volatile, nonvolatile, removable, and non-removable media implemented in any method or technology for storage of information such as computer- or processor-readable instructions, data structures, program modules, or other data. Examples of computer readable storage media include RAM, ROM, electrically erasable programmable read-only memory (EEPROM), flash memory or other memory technology, Compact disc read-only memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computing device. The aforementioned readable storage media 652 may also be referred to herein as computer readable storage media.

The client device applications 646 may include computer executable instructions which, when executed by client device 6B01, transmit, receive, and/or otherwise process network data. The network data may include, but is not limited to, messages (e.g., SMS, multimedia message service (MMS), instant message (IM), email, and/or other messages), audio, video, and enable telecommunication with another user of another client device. Client device applications 646 may include, for example, a messenger 662, a browser 647, and other applications 648. Other applications 648 may include, but are not limited to, calendars, search programs, email clients, IM applications, SMS applications, voice over Internet protocol (VOIP) applications, contact managers, task managers, transcoders, database programs, word processing programs, security applications, spreadsheet programs, games, search programs, and so forth. In some embodiments, other applications 648 may collect and store user data that may be received from other computing devices in the environment.

A messenger 662 may be configured to manage a messaging session using any of a variety of messaging communications including, but not limited to email, SMS, IM, MMS, internet relay chat (IRC), Microsoft IRC (mIRC), really simple syndication (RSS) feeds, and/or the like. For example, in one embodiment, the messenger 662 may be configured as an IM application such as AOL (America Online) instant messenger, Yahoo! messenger, .NET messenger server, ICQ ("I seek you") or the like. In one embodiment, the messenger 662 may be configured to include a mail user agent (MUA) such as Elm, Pine, message handling (MH), Outlook, Eudora, Mac Mail, Mozilla Thunderbird or the like. In another embodiment, the messenger 662 may be a client device application that is configured to integrate and employ a variety of messaging protocols including, but not limited, to various push and/or pull mechanisms for client device 6B01. In one embodiment, the messenger 662 may interact with the browser 647 for managing messages. As used herein, the term "message" refers to any of a variety of messaging formats, or communications form including, but not limited to, email, SMS, IM, MMS, IRC or the like.

A browser 647 may include virtually any application configured to receive and display graphics, text, multimedia, messages and the like, employing virtually any web based language. In one embodiment, the browser application is enabled to employ HDML, WML, WMLScript, JavaScript, SGML, HTML, XML and the like, to display and send a message. However, any of a variety of other web-based programming languages may be employed. In one embodiment, a browser 647 may enable a user of client device 6B01 to communicate with another network device as may be present in the environment.

Figure 6C:
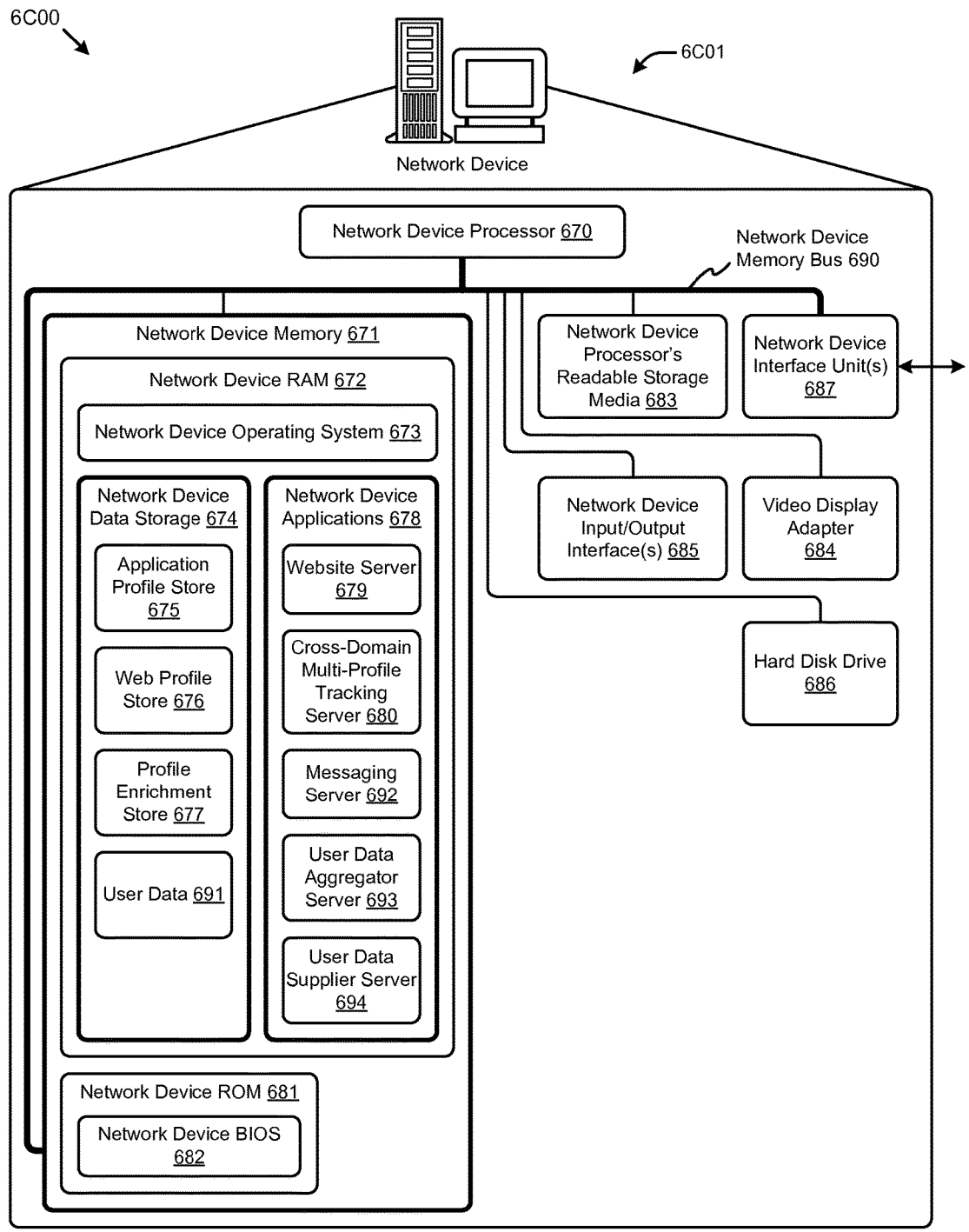

FIG. 6C depicts a block diagram 6C00 of an instance of a network device 6C01 that may be included in a system implementing instances of the herein-disclosed embodiments. Network device 6C01 may include many more or fewer components than those shown. Network device 6C01 may be configured to operate as a server, client, peer, a host, or any other device.

Network device 6C01 includes at least one network device processor 670, instances of readable storage media 683, network interface(s) 687, a network device input/output interface 685, a hard disk drive 686, a video display adapter 684, and a network device memory 671, all in communication with each other via a network device memory bus 690. The network device memory generally includes network device RAM 672, network device ROM 681. Some embodiments include one or more non-volatile mass storage devices such as a hard disk drive 686, a tape drive, an optical drive, and/or a floppy disk drive. The network device memory stores a network device operating system 673 for controlling the operation of network device 6C01. Any general-purpose operating system may be employed. A basic input/output system (BIOS) is also provided in the form of network device BIOS 682 for controlling the low-level operation of network device 6C01. As illustrated in FIG. 6C, a network device 6C01 also can communicate with the Internet, or some other communications network, via a network interface unit 687, which is constructed for use with various communication protocols including the TCP/IP protocol. The network interface unit 687 is sometimes known as a transceiver, a transceiving device, or a network interface card (NIC).

Network device 6C01 also comprises a network device input/output interface 685 for communicating with external devices such as a keyboard or other input or output devices. A network device input/output interface 685 can use one or more communication technologies such as USB, infrared, Bluetooth™ or the like.

The storage devices as described above may use various types of computer readable media, namely non-volatile computer readable storage media and/or a client device processor's readable storage media 683 and/or a network device processor's readable storage media 683. Such media may include any combinations of volatile, nonvolatile, removable, and non-removable media implemented in any method or technology for storage of information such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

As shown, network device data storage 674 may include a database, text storage, a spreadsheet, a folder or directory hierarchy, a file or files or the like that may be configured to maintain and store user account identifiers, user profiles, email addresses, IM addresses, and/or other network addresses or the like. Network device data storage 674 may further include program code, data, algorithms and the like, for use by a processor such as a network device processor 670 to execute and perform actions. In one embodiment, at least some of the logical contents of network device data storage 674 might be stored on another component of network device 6C01, such as on a second instance of hard disk drive 686 or on an external/removable storage device.

The network device data storage 674 may further store any portions of application data and/or user data such as an application profile store 675, a web profile store 676, a profile enrichment store 677 and/or any user data collected. In some embodiments, user data 691 may store unique user data, non-unique user data, aggregated user data, and/or any combination thereof. User data 691 may include a variety of attributes such as a five digit zip code, an expanded nine digit zip code and the like.

The Network device data storage 674 may also store program code and data. One or more network device applications 678 may be loaded into network device data storage or any other mass memory, to be accessible to run with or as a part of network device operating system 673. Examples of network device application programs may include transcoders, schedulers, calendars, database programs, word processing programs, hypertext transfer protocol (HTTP) programs, customizable user interface programs, IPSec applications, encryption programs, security programs, SMS message servers, IM message servers, email servers, account managers, and so forth. A messaging server 692, website server 679, user data aggregator server 693, a cross-domain multi-profile tracking server 680, and/or user data supplier server 694 may also be included within or implemented as application programs.

A messaging server 692 may include virtually any computing component or components configured and arranged to forward messages from message user agents and/or other message servers, or to deliver messages to a local message store such as network device data storage 674 or the like. Thus, a messaging server 692 may include a message transfer manager to communicate a message employing any of a variety of email protocols including, but not limited, to simple mail transfer protocol (SMTP), post office protocol (POP), Internet message access protocol (IMAP), network new transfer protocol (NNTP) or the like. A messaging server 692 may also be managed by one or more components of the messaging server 692. Thus, the messaging server 692 may also be configured to manage SMS messages; IM, MMS, IRC, or RSS feeds; mIRC; or any of a variety of other message types. In one embodiment, the messaging server 692 may enable users to initiate and/or otherwise conduct chat sessions, VOIP sessions or the like.

A website server 679 may represent any of a variety of information and services that are configured to provide content, including messages, over a network to another computing device. Thus, a website server 679 can include, for example, a web server, a file transfer protocol (FTP) server, a database server, a content server or the like. A website server 679 may provide the content including messages over the network using any of a variety of formats including, but not limited to WAP, HDML, WML, SGML, HTML, XML, compact HTML (cHTML), extensible HTML (xHTML) or the like. A website server 679 may also be configured to enable a user of a client device to browse websites, upload user data, view and interact with advertisements or the like.

A user data aggregator server 693 is configured to aggregate user data to be provided to user data buyers for advertising campaigns. In one embodiment, a user data aggregator server 693 may be configured to receive collected user data from a user data supplier server 694. In some embodiments, a user data aggregator server 693 may receive a query for user data. Based on the query, a user data aggregator server 693 may generate a plurality of subsets of aggregated user data. In some embodiments, user data aggregator server 693 may be included in a network device.

A user data supplier server 694 is configured to collect user data. In one embodiment, the user data supplier server 694 may be configured to provide the collected user data to user data aggregator server 693. In some embodiments, the user data supplier server 694 may collect and/or provide unique user data and/or non-unique user data. In one embodiment, the user data supplier server 694 may aggregate the collected user data. In some embodiments, the user data supplier server 694 may be included in any computing device such as heretofore described.

Returning to discussion of the heretofore introduced environments, the environments includes components with which various systems can be implemented. Not all of the components shown may be required to practice the embodiments, and variations in the arrangement and type of the components may be made without departing from the spirit or scope of the disclosure.

Various environment in which embodiments of the disclosure operate may include local area networks (LANs)/wide area networks (WANs), wireless networks, client devices (e.g., user stations). The overall network including any sub-networks and/or wireless networks are in communication with, and enables communication between each of the components the environment.

Instances of client devices may include virtually any computing device capable of communicating over a network to send and receive information, including instant messages, performing various online activities or the like. It should be recognized that more or fewer client devices may be included within a system such as described herein, and embodiments are therefore not constrained by the number or type of client devices employed.

Devices that may operate as client devices may include devices that can connect using a wired or wireless communications medium such as personal computers, servers, multiprocessor systems, microprocessor-based or programmable consumer electronics, network PCs or the like. In some embodiments, client devices may include virtually any portable computing device capable of connecting to another computing device and receiving information such as a laptop computer, a smart phone, a tablet computer, or the like. Portable or mobile computer devices are may also include or operate in conjunction with other portable devices such as cellular telephones, display pagers, radio frequency (RF) devices, infrared (IR) devices, personal digital assistants (PDAs), handheld computers, wearable computers integrated devices combining one or more of the preceding devices and the like. As such, client devices can range widely in terms of capabilities and features. Moreover, client devices may provide access to various computing applications including a browser or other web-based applications. A web-enabled client device may include a browser application that is configured to receive and to send web pages, web-based messages and the like. The browser application may be configured to receive and display graphics, text, multimedia and the like, employing virtually any web-based language including a wireless application protocol messages (WAP) and the like. In one embodiment, the browser application is enabled to employ handheld device markup language (HDML), wireless markup language (WML), WMLScript, JavaScript, standard generalized markup language (SGML), HyperText markup language (HTML), eXtensible markup language (XML) and the like, to display and send a message. In one embodiment, a user of the client device may employ the browser application to perform various activities over a network (online). However, another application may also be used to perform various online activities.

Client devices may include at least one client application that is configured to receive and/or send data between another computing device (e.g., a server component). The client application may include a capability to provide send and/or receive content or the like. The client application may further provide information that identifies itself including a type, capability, name or the like. In one embodiment, a client device may uniquely identify itself through any of a variety of mechanisms including a phone number, mobile identification number (MIN), an electronic serial number (ESN), or other mobile device identifier. The information may also indicate a content format that the mobile device is enabled to employ. Such information may be provided in a network packet or the like, sent between other client devices, or sent between other computing devices.

Client devices may be further configured to include a client application that enables an end-user to log into an end-user account that may be managed by another computing device. Such end-user accounts, in one non-limiting example, may be configured to enable the end-user to manage one or more online activities including, in one non-limiting example, search activities, social networking activities, browse various websites, communicate with other users, participate in gaming, interact with various applications or the like. However, participation in online activities may also be performed without logging into the end-user account.

A wireless communication capability is configured to couple client devices and other components with network.

Wireless network may include any of a variety of wireless sub-networks that may further overlay stand-alone and/or ad-hoc networks and the like, to provide an infrastructure-oriented connection for client devices. Such sub-networks may include mesh networks, wireless LAN (WLAN) networks, cellular networks and the like. In one embodiment, the system may include more than one wireless network.

A wireless network may further include an autonomous system of terminals, gateways, routers, mobile network edge devices and the like which may be connected by wireless radio links, etc. Connections may be configured to move freely and randomly and organize themselves arbitrarily such that the topology of a wireless network may change rapidly. A wireless network may further employ a plurality of access technologies including AMPS and/or second generation (2G), and/or third generation (3G), and/or fourth generation (4G) generation radio access for cellular systems, WLAN, wireless router (WR) mesh and the like. The foregoing access technologies as well as emerging and/or future access technologies may enable wide area coverage for mobile devices such as client devices with various degrees of mobility. In one non-limiting example, wireless network may enable a radio connection through a radio network access such as a global system for mobile (GSM) communication, general packet radio services (GPRS), enhanced data GSM environment (EDGE), wideband code division multiple access (WCDMA) and the like. A wireless network may include any wireless communication mechanism by which information may travel between client devices and/or between another computing device or network.

Any of the foregoing networks can be configured to couple network devices with other computing devices and communication can include communicating between the Internet. In some situations communication is carried out using combinations of LANs, WANs, as well as direct connections such as through a universal serial bus (USB) port, other forms of computer readable media. On an interconnected set of LANs, including those based on differing architectures and protocols, a router acts as a link between LANs, enabling messages to be sent from one to another. In addition, communication links within LANs may include twisted wire pair or coaxial cable, while communication links between networks may use analog telephone lines, full or fractional dedicated digital lines including T1, T2, T3, and T4, and/or other carrier mechanisms including, for example, E-carriers, integrated services digital networks (ISDNs), digital subscriber lines (DSLs), wireless links including satellite links, or other communications links known to those skilled in the art. Moreover, communication links may further employ any of a variety of digital signaling technologies including, without limit, for example, DS-0, DS-1, DS-2, DS-3, DS-4, OC-3, OC-12, OC-48 or the like. Furthermore, remote computers and other related electronic devices can be remotely connected to either LANs or WANs via a modem and temporary telephone link. In one embodiment, network 108 may be configured to transport information of an Internet protocol (IP). In some cases, communication media carries computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than in a restrictive sense.

What is claimed is:

1. A system for content delivery by simulating user web page visits, the system comprising:
　using a content server, that comprises one or more first processors and one or more first memories, to perform first actions including:
　　receiving, from a client device, a request that includes one or more constraints and is for data corresponding to user sessions characterizing web page visits that satisfy at least one of the one or more constraints; and
　　sending the request to a simulation server;
　using the simulation server, that comprises one or more second processors and one or more second memories, to perform second actions including:
　　transmitting, to a visit database, a query for session records that include a timestamp within a predefined time period;
　　receiving, as a result of the query and from the visit database, a set of session records, each session record of the set of session records comprising a set of record attributes, the set of record attributes identifying a user ID, a URL, and a first timestamp, wherein the first timestamp indicates a time of a visit to the URL by a user device associated with the user ID;
　　generating, for each session record of the set of session records, a simulated HTTP call of a set of simulated HTTP calls for the session record, wherein the simulated HTTP call includes one or more properties, wherein a first property of the one or more properties corresponds to a record attribute of the set of record attributes included in the session record, and wherein a second property of the one or more properties includes a second timestamp that is different than the first timestamp;
　　sending, to a visit server, the set of simulated HTTP calls;
　using the visit server, that comprises one or more third processors and one or more third memories, to perform third actions including:
　　receiving the set of simulated HTTP calls;
　　for each simulated HTTP call of the set of simulated HTTP calls:
　　　identifying, using the first property of the simulated HTTP call and from amongst the set of session records, a session record that corresponds to the simulated HTTP call, as an identified session record of a set of identified session records; and
　　　updating the identified session record to include one or more updated record attributes that represent a simulated session associated with the second timestamp and corresponding to the simulated HTTP call to produce an updated session record of a set of updated session records;
　　sending the set of updated session records to the content server;

further using the content server to perform fourth actions including:
  identifying a subset of the set of updated session records, wherein, for each updated session record in the subset, a constraint-processing condition is satisfied based on the set of record attributes in the updated session record;
  generating a response communication that includes, for each updated session record in the subset, data from the updated session record; and
  transmitting, to the client device, the response communication.

2. The system of claim 1, wherein the constraint-processing condition is satisfied by inclusion of all of the one or more constraints.

3. The system of claim 1, wherein the constraint-processing condition is satisfied by inclusion of any of the one or more constraints.

4. The system of claim 1, wherein the constraint-processing condition is satisfied by inclusion of one constraint but not a second constraint of at least two of the one or more constraints.

5. The system of claim 1, wherein the first timestamp is within a thirty day range of dates of the request.

6. The system of claim 1, wherein updating a session record of a set of session records causes an update to a user profile of a user identified by the user ID.

7. The system of claim 1, wherein the updated session record is matched to a campaign specification.

8. The system of claim 1, further comprising an ad campaign audience generator collecting at least one updated session record.

9. The system of claim 8, wherein the updated session record is collected in response to the constraint-processing condition being satisfied.

10. The system of claim 8, further comprising:
an ad server to receive a new campaign specification for an advertising campaign, wherein the new campaign specification includes a set of attributes of a target audience, the target audience comprises at least one user with at least one updated session record that matches at least some attributes of the target audience.

11. A processor-based method for content delivery by simulating user web page visits, the method comprising:
using a content server, that comprises one or more first processors and one or more first memories, to perform first actions including:
  receiving, from a client device, a request that includes one or more constraints and is for data corresponding to user sessions characterizing web page visits that satisfy at least one of the one or more constraints; and
  sending the request to a simulation server;
using the simulation server, that comprises one or more second processors and one or more second memories, to perform second actions including:
  transmitting, to a visit database, a query for session records that include a timestamp within a predefined time period;
  receiving, as a result of the query and from the visit database, a set of session records, each session record of the set of session records comprising a set of record attributes, the set of record attributes identifying a user ID, a URL, and a first timestamp, wherein the first timestamp indicates a time of a visit to the URL by a user device associated with the user ID;
  generating, for each session record of the set of session records, a simulated HTTP call of a set of simulated HTTP calls for the session record, wherein the simulated HTTP call includes one or more properties, wherein a first property of the one or more properties corresponds to a record attribute of the set of record attributes included in the session record, and wherein a second property of the one or more properties includes a second timestamp that is different than the first timestamp included in the session record;
  sending, to a visit server, the set of simulated HTTP calls;
using the visit server, that comprises one or more third processors and one or more third memories, to perform third actions including:
  receiving the set of simulated HTTP calls;
  for each simulated HTTP call of the set of simulated HTTP calls:
    identifying, using the first property of the simulated HTTP call and from amongst the set of session records, a session record that corresponds to the simulated HTTP call, as an identified session record of a set of identified session records; and
    updating the identified session record to include one or more updated record attributes that represent a simulated session associated with the second timestamp and corresponding to the simulated HTTP call to produce an updated session record of a set of updated session records;
  sending the set of updated session records to the content server;
further using the content server to perform fourth actions including:
  identifying a subset of the updated session records, wherein, for each updated session record in the subset, a constraint-processing condition is satisfied based on the set of record attributes in the updated session record;
  generating a response communication that includes, for each updated session record in the subset, data from the updated session record; and
  transmitting, to the client device, the response communication.

12. The method of claim 11, wherein the constraint-processing condition is satisfied by inclusion of all of the one or more constraints.

13. The method of claim 11, wherein the constraint-processing condition is satisfied by inclusion of any of the one or more constraints.

14. The method of claim 11, wherein the constraint-processing condition is satisfied by inclusion of one constraint but not a second constraint of at least two of the one or more constraints.

15. The method of claim 11, wherein the first timestamp is within a thirty day range of dates of the request.

16. The method of claim 11, wherein updating a session record of a set of session records causes an update to a user profile of a user identified by the user ID.

17. The method of claim 11, wherein the updated session record is matched to a campaign specification.

18. A computer program product for content delivery by simulating user web page visits embodied in a non-transitory, computer readable medium, the computer readable medium having stored thereon a sequence of instructions which, when executed by a processor causes the processor to execute a process, the process comprising:

using a content server, that comprises one or more first processors and one or more first memories, to perform first actions including:
  receiving, from a client device, a request that includes one or more constraints and is for data corresponding to user sessions characterizing web page visits that satisfy at least one of the one or more constraints; and
  sending the request to a simulation server;
using the simulation server, that comprises one or more second processors and one or more second memories, to perform second actions including:
  transmitting, to a visit database, a query for session records that include a timestamp within a predefined time period;
  receiving, as a result of the query and from the visit database, a set of session records, each session record of the set of session records comprising a set of record attributes, the set of record attributes identifying a user ID, a URL, and a first timestamp, wherein the first timestamp indicates a time of a visit to the URL by a user device associated with the user ID;
  generating, for each session record of the set of session records, a simulated HTTP call of a set of simulated HTTP calls or the session record, wherein the simulated HTTP call includes one or more properties, wherein a first property of the one or more properties corresponds to a record attribute of the set of record attributes included in the session record, and wherein a second property of the one or more properties includes a second timestamp that is different than the first timestamp;
  sending, to a visit server, the set of simulated HTTP calls;
using the visit server, that comprises one or more third processors and one or more third memories, to perform third actions including:
  receiving the set of simulated HTTP calls;
  for each simulated HTTP call of the set of simulated HTTP calls:
    identifying, using the first property of the simulated HTTP call and from amongst the set of session records, a session record that corresponds to the simulated HTTP call, as an identified session record of a set of identified session records; and
    updating the identified session record to include one or more updated record attributes that represent a simulated session associated with the second timestamp and corresponding to the simulated HTTP call to produce an updated session record of a set of updated session records;
  sending the set of updated session records to the content server;
further using the content server to perform fourth actions including:
  identifying a subset of the set of updated session records, wherein, for each updated session record in the subset, a constraint-processing condition is satisfied based on the set of record attributes in the updated session record;
  generating a response communication that includes, for each updated session record in the subset, data from the updated session record; and
  transmitting, to the client device, the response communication.

19. The computer program product of claim 18, wherein the constraint-processing condition is satisfied by inclusion of all of the one or more constraints.

20. The computer program product of claim 18, wherein the constraint-processing condition is satisfied by inclusion of any of the one or more constraints.

21. The computer program product of claim 18, wherein the constraint-processing condition is satisfied by inclusion of any of the one or more constraints.

22. The computer program product of claim 18, wherein the constraint-processing condition is satisfied by inclusion of one constraint but not a second constraint of at least two of the one or more constraints.

23. The computer program product of claim 18, wherein the first timestamp is within a thirty day range of dates of the request.

24. The computer program product of claim 18, wherein the updated session record is matched to a campaign specification.

* * * * *

UNITED STATES PATENT AND TRADEMARK OFFICE
CERTIFICATE OF CORRECTION

PATENT NO. : 9,805,392 B2
APPLICATION NO. : 14/593331
DATED : October 31, 2017
INVENTOR(S) : Connelly et al.

Page 1 of 1

It is certified that error appears in the above-identified patent and that said Letters Patent is hereby corrected as shown below:

In the Specification

In Column 7, Line 42, delete "1 C2." and insert -- 1C2. --, therefor.

In Column 17, Line 62, delete "PTSN" and insert -- PSTN --, therefor.

In Column 20, Line 9, delete "iOS™" and insert -- iOS™, --, therefor.

Signed and Sealed this
Nineteenth Day of June, 2018

Andrei Iancu
*Director of the United States Patent and Trademark Office*